United States Patent
Okamoto et al.

(10) Patent No.: US 10,447,017 B2
(45) Date of Patent: Oct. 15, 2019

(54) ELECTRIC STORAGE DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); HONDA MOTOR CO., LTD., Tokyo (JP)

(72) Inventors: Ryouya Okamoto, Mie (JP); Hiroki Hirai, Mie (JP); Tetsuji Tanaka, Mie (JP); Hiroshi Shimizu, Mie (JP); Hitoshi Takeda, Mie (JP); Hiroki Itaya, Saitama (JP); Eiji Koike, Saitama (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/093,011

(22) PCT Filed: Apr. 13, 2017

(86) PCT No.: PCT/JP2017/015109
§ 371 (c)(1),
(2) Date: Oct. 11, 2018

(87) PCT Pub. No.: WO2017/179650
PCT Pub. Date: Oct. 19, 2017

(65) Prior Publication Data
US 2019/0157851 A1  May 23, 2019

(30) Foreign Application Priority Data

Apr. 14, 2016 (JP) .................... 2016-081088

(51) Int. Cl.
*H02G 3/08* (2006.01)
*H01M 2/10* (2006.01)
(Continued)

(52) U.S. Cl.
CPC ............ *H02G 3/08* (2013.01); *H01B 7/0045* (2013.01); *H01G 11/10* (2013.01); *H01G 11/78* (2013.01);
(Continued)

(58) Field of Classification Search
CPC ....... H02G 3/08; H01M 2/10; H01M 2220/20
See application file for complete search history.

(56) References Cited

U.S. PATENT DOCUMENTS 7,507,094 B2 * 3/2009 Kubota ............. H01R 13/6271
439/76.2
8,163,994 B2 * 4/2012 Taniguchi ............. H02G 3/081
174/50
(Continued)

FOREIGN PATENT DOCUMENTS

JP 2001-069673 3/2001
JP 2006-044443 2/2006
(Continued)

OTHER PUBLICATIONS

International Search Report in International Patent Application No. PCT/JP2017/015109, dated Jun. 6, 2017, along with an English translation thereof.

*Primary Examiner* — Robert J Hoffberg
(74) *Attorney, Agent, or Firm* — Greenblum & Bernstein, P.L.C.

(57) ABSTRACT

An electric storage device includes an electric storage module, a bracket, an electric junction box, and a wire harness.

The electric storage module includes electric storage components. The electric storage module includes an end surface and peripheral surfaces perpendicular to the end surface. The bracket is mounted to the electric storage module and includes a first surface opposed to the end surface of the electric storage module and a second surface opposite from the first surface. The electric junction box is mounted to the bracket to be opposed to the second surface of the bracket with a gap between the electric junction box and the second surface of the bracket. The wire harness is connected to the electric storage module and disposed in a section of the gap in which the end surface of the electric storage module is opposed to the electric junction box.

2 Claims, 30 Drawing Sheets

(51) Int. Cl.
*H01G 11/10* (2013.01)
*H01G 11/78* (2013.01)
*H01B 7/00* (2006.01)
*H02G 3/04* (2006.01)

(52) U.S. Cl.
CPC ........... *H01M 2/10* (2013.01); *H01M 2/1072* (2013.01); *H02G 3/0456* (2013.01); *H01M 2220/20* (2013.01)

(56) References Cited

U.S. PATENT DOCUMENTS

| | | | |
|---|---|---|---|
| 8,704,109 B2 * | 4/2014 | Demma | B60R 16/0239 174/541 |
| 8,859,121 B2 | 10/2014 | Seto | |
| 10,090,495 B2 | 10/2018 | Hasegawa et al. | |
| 2006/0030176 A1 | 2/2006 | Ikeda et al. | |
| 2011/0300427 A1 | 12/2011 | Iwasa et al. | |
| 2018/0118136 A1 * | 5/2018 | Carremm et al. | F16L 3/26 |

FOREIGN PATENT DOCUMENTS

| | | | |
|---|---|---|---|
| JP | 2012-084422 | 4/2012 | |
| JP | 2012-176751 | 9/2012 | |
| JP | 2012-232641 | 11/2012 | |
| JP | 2015-067098 | 4/2015 | |
| WO | 2010-098418 | 9/2010 | |
| WO | WO-2016001532 A1 * | 1/2016 | ......... B60R 16/0215 |
| WO | 2016-031863 | 3/2016 | |
| WO | 2016-031864 | 3/2016 | |

* cited by examiner

ELECTRIC STORAGE DEVICE

TECHNICAL FIELD

The present invention relates to an electric storage device.

BACKGROUND ART

An electric storage device installed in an electric vehicle and a hybrid vehicle includes at least an electric storage module, a control unit, and a junction box (see Patent Document 1). The electric storage module includes battery cells. The control unit is for monitoring states of the battery cells and controlling the battery cells. The junction box is for controlling power supply from the electric storage module.

CITATION LIST

Patent Document

Patent Document 1: Japanese Unexamined Patent Application Publication No. 2012-84422A

SUMMARY OF INVENTION

Technical Problem

Wire harnesses have been increased in size as performances of vehicles increases. On the other hand, demand for comfort of occupants of the vehicles is growing and thus interior volumes of the vehicles are increasing. Spaces in which the wire harnesses are disposed are limited and thus there is demand for reducing overall sizes of electric storage devices including wire harnesses.

Solution to Problem

An electric storage device described herein includes an electric storage module that includes electric storage components. The electric module includes a surface on which a bracket is disposed. An electric junction box is mounted to the bracket from an opposite side from the electric storage module with a gap between the electric junction box and the surface. A first wire harness is connected to the electric storage module and disposed in a section of the gap defined by imaginary planes extending from peripheral surface of the electric storage module perpendicular to the surface.

According to the configuration, the first wire harness is disposed in the gap between the electric module and the electric junction box. Therefore, the electric storage device can be reduced in size. Furthermore, the first wire harness is disposed in the section of the gap defined by the imaginary planes extending from the peripheral surfaces of the electric storage module perpendicular to the surface. Therefore, the electric storage device can be reduced in size.

The electric storage device having the above configuration further includes a control unit disposed on another surface of the electric storage module different from the surface. The control unit is configured to control states of the electric storage components. A second wire harness is connected to the control unit. A first connector attached to the first wire harness and a second connector attached to the second wire harness are configured to be fitted together. The second connector is mounted to the bracket.

According to the configuration, through the fitting of the first connector and the second connector, the control unit is electrically connected to the electric storage module.

Because the second connector is mounted to the bracket, the second wire harness can be easily positioned. Before the first connector is fitted in the second connector, the first wire harness can be freely routed. Because the first wire harness can be freely routed to fit the first connector and the second connector together, work efficiency in the fitting improves. When the fitting of the first connector and the second connector is completed, the first wire harness can be easily positioned because the second connector is mounted to the bracket. Therefore, work efficiency in the routing of the first wire harness improves.

Effect of the Invention

According to the technology described herein,

DESCRIPTION OF EMBODIMENTS

Figure 1:
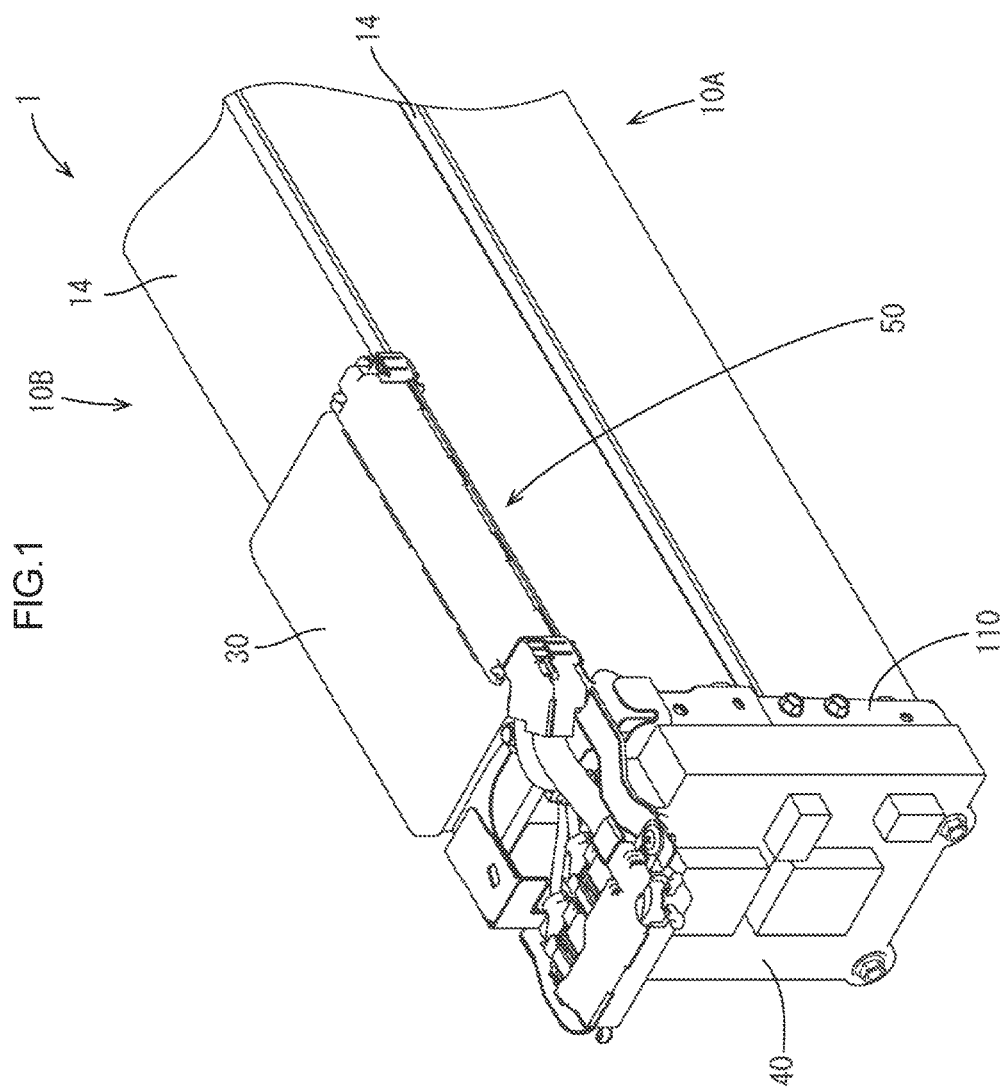
FIG. 1 is a perspective view of an electric storage device according to an embodiment.
Figure 2:
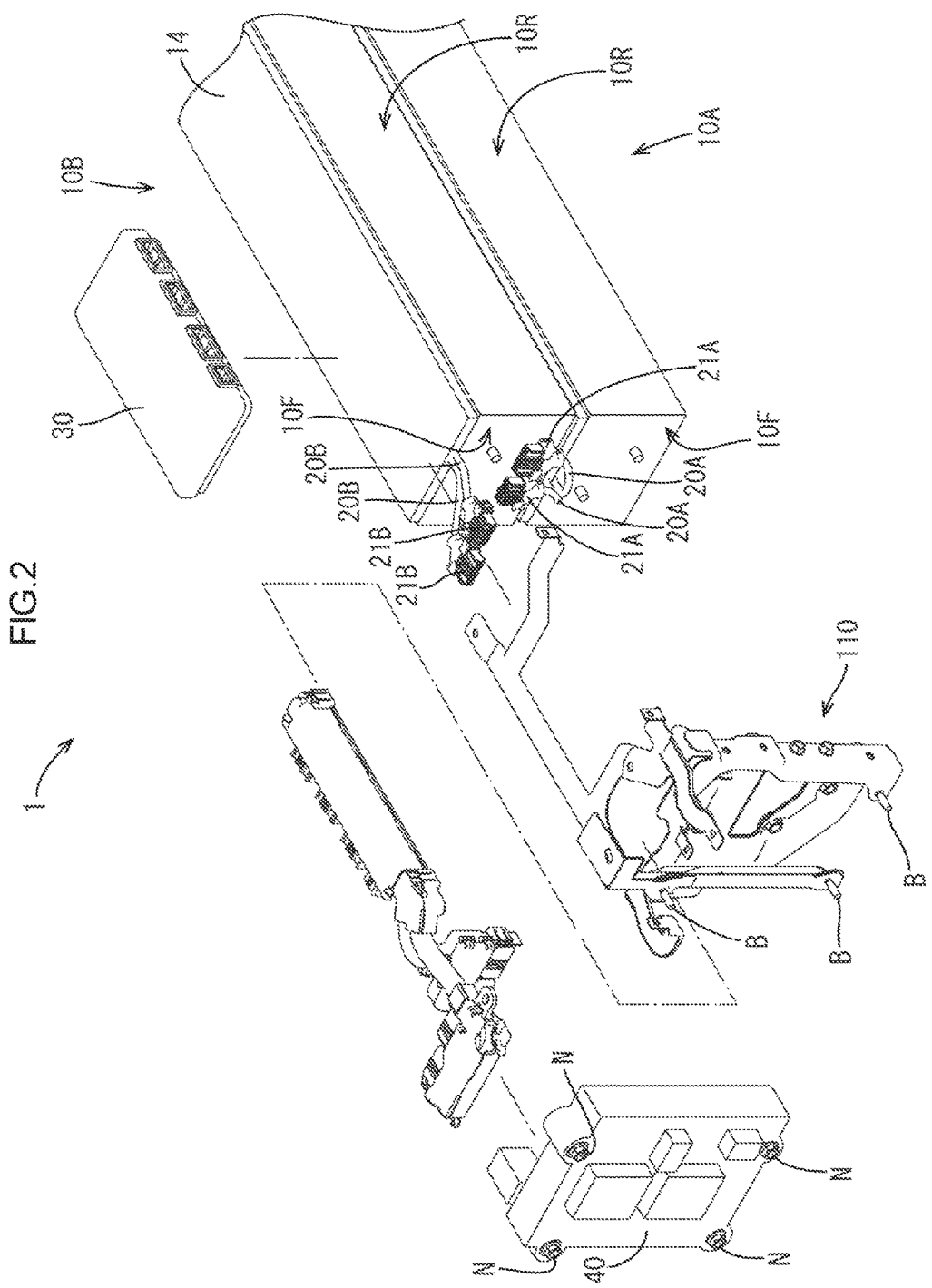
FIG. 2 is an exploded perspective view of the electric storage device.

An embodiment of the technology disclosed herein will be described with reference to FIGS. 1 to 31. An electric storage device 1 according to this embodiment is to be installed in a vehicle (not illustrated) such as an electric vehicle and a hybrid vehicle for a power source to drive the vehicle. As illustrated in FIGS. 1 and 2, the electric storage device 1 includes two electric storage modules 10A and 10B, first wire harnesses 20A and 20B, a bracket 110, an electronic control unit (ECU) 30 (corresponding to a control unit), an electric junction box 40, and a connecting unit 50. The first wire harnesses 20A and 20B are connected with the electric storage modules 10A and 10B. The bracket 110 is mounted to the electric storage modules 10A and 10B. The ECU 30 is attached to the electric storage modules 10A and 10B via the bracket 110. The electric junction box 40 is attached to the electric storage modules 10A and 10B via the bracket 110. The connecting unit 50 connects the ECU 30 to the electric storage modules 10A and 10B.

[Electric Storage Modules 10A and 10B and the First Wire Harnesses 20A and 20B]

The electric storage modules 10A and 10B included in the electric storage device 1 have the same configuration. Therefore, the electric storage module 10A (on the lower side in FIG. 1) will be described in detail.

Figure 3:
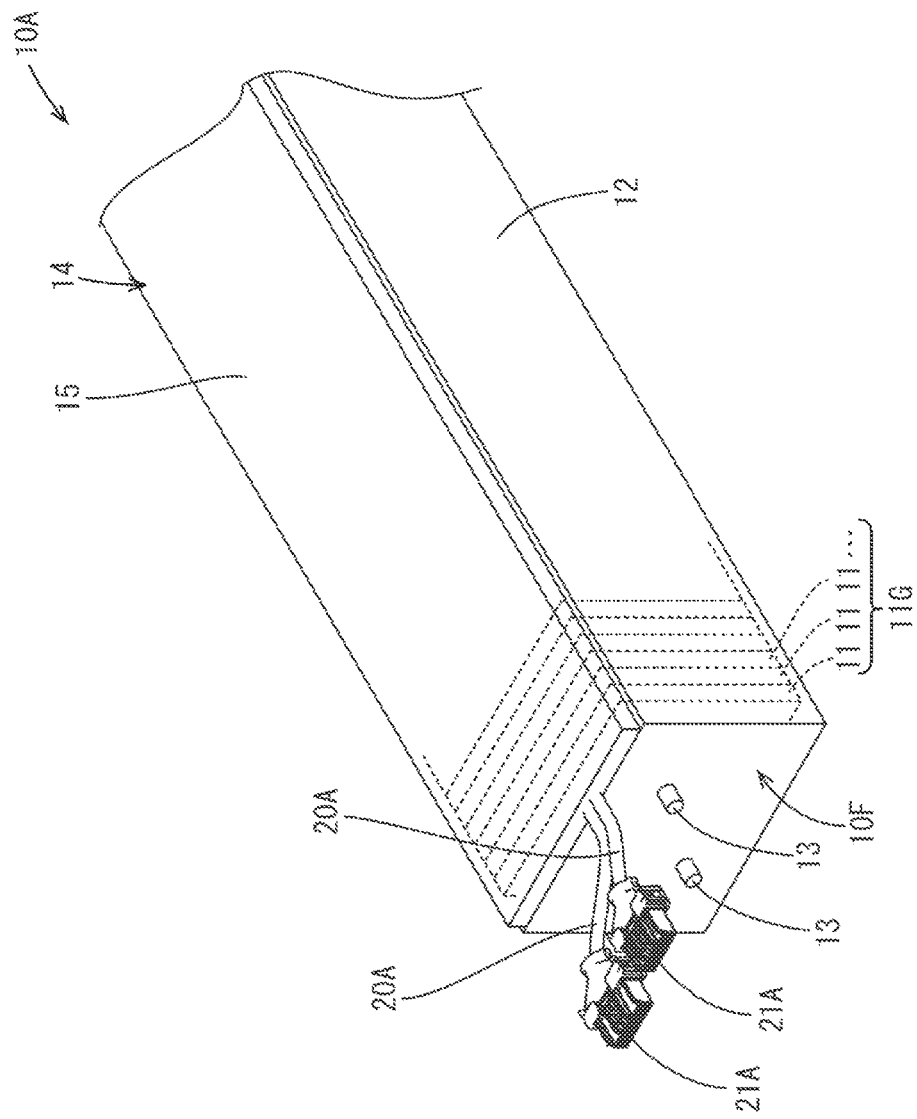
FIG. 3 is a perspective view of an electric storage module.

As illustrated in FIG. 3, the electric storage module 10A has an elongated rectangular box shape. The electric storage module 10A includes a batch of electric storage components 11G, a holding member 12, and a wire module 14. The batch of electric storage components 11G includes electric storage components 11. The holding member 12 is attached to the batch of electric storage components 11G to collectively hold the electric storage components 11. The wire module 14 is attached to the batch of electric storage components 11G.

Each electric storage component 11 is a secondary battery that has a flat box shape. The batch of electric storage components 11G has a configuration in which the electric storage components 11 are disposed in line to form an elongated cuboid overall shape.

The holding member 12 may include a pair of end plates and a connecting member that connects one of the end plates to the other although they are not illustrated in detail. The end plates may be disposed at ends of the line of the electric storage components 11, respectively. One of the surfaces of the electric storage module 10A (if the holding member 12 includes the end plates, an outer surface of one of the end plates) is configured as a terminal disposing surface 10F. A positive output terminal 13 and a negative output terminal 13 project from the terminal disposing surface 10F. Each output terminal 13 has a columnar shape. The output terminals 13 are threaded although threads are not illustrated.

The wire module 14 has an elongated rectangular overall shape. The wire module 14 is disposed along a plane on the batch of electric storage components 11G perpendicular to a plane on which the terminal disposing surface 10F is disposed. The wire module 14 includes at least a busbar plate 15, busbars (not illustrated), and voltage sensors (not illustrated). The busbar plate 15 is made of synthetic resin. The busbars held by the busbar plate 15 connect adjacent electrodes of the electric storage components 11. The voltage sensors held by the busbar plate 15 detect voltages of the electric storage components. The electric storage compo- nents 11 are connected in series by the busbars and electrically connected to the output terminals 13.

Electric wires (not illustrated) are connected to the voltage sensors, respectively. The electric wires are pulled out of an edge of the busbar plate 15 adjacent to the terminal disposing surface 10F. Portions of the electric wires outside the busbar plate 15 are divided into two bundles that are covered with insulating sheaths. The portions are the first wire harnesses 20A. First connectors 21A are connected with ends of the first wire harnesses 20A, respectively.

Figure 4:
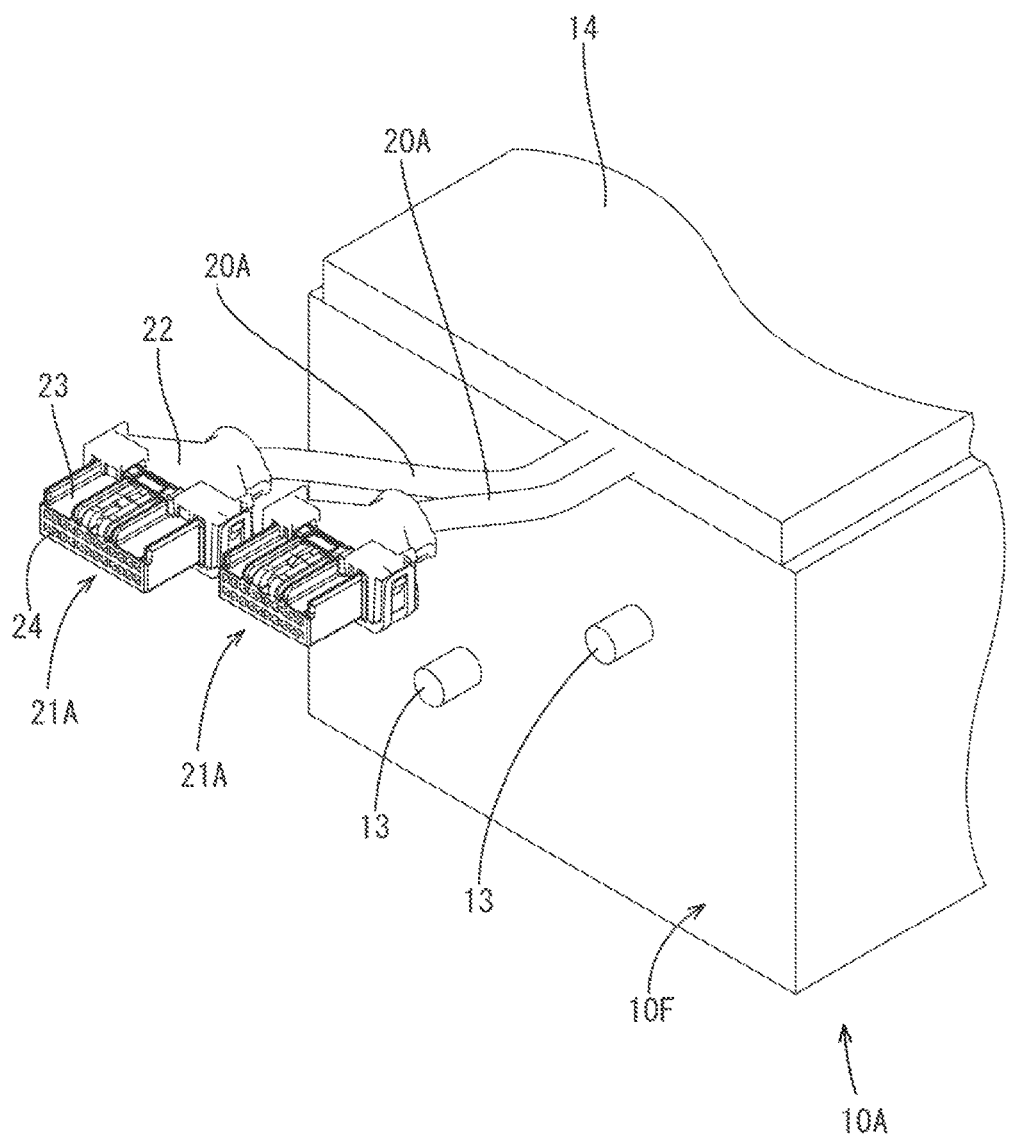
FIG. 4 is a partial magnified view illustrating the electric storage module, first wire harnesses, and first connectors.

The first connectors 21A are made of synthetic resin. As illustrated in FIG. 4, the first connectors 21A include wire covering portions 22 and connector bodies 23. The wire covering portions 22 cover the ends of the first wire harnesses 20A. The connector bodies 23 protrude from the wire covering portions 22. Each connector body 23 has a cuboid overall shape and includes cavities 24 for holding terminal fittings therein. The terminal fittings held in the respective cavities 24 are press-fitted on ends of the electric wire included in the first wire harnesses 20A.

The configurations of the electric storage module 10B (on the upper side in FIG. 1) and the first wire harnesses 20B and the first connectors 21B connected to the electric storage module 10B similar to the configurations of the electric storage module 10A and the first wire harnesses 20A and the first connectors 21A connected to the electric storage module 10A will not be described.

As illustrated in FIGS. 1 and 2, the electric storage modules 10A and 10B are placed on top of each other such that a surface of the electric storage module 10A on a side on which the wire module 14 is disposed is opposed to a surface of the electric storage module 10B on an opposite side from the wire module 14. The electric storage modules 10A and 10B are placed on top of each other such that the terminal disposing surfaces 10F face the same side. The first wire harnesses 20A extending from the electric storage module 10A and the first wire harnesses 20B extending from the electric storage module 10B are disposed on the same side. The terminal disposing surface 10F of the electric storage module 10A and the terminal disposing surface 10F of the electric storage module 10B are disposed on the same plane. A first side surface 10R of the electric storage module 10A and a first side surface 10R of the electric storage module 10B are disposed on the same plane. A second side surface 10L of the electric storage module 10A and a second side surface 10L of the electric storage module 10B are disposed on the same plane.

[ECU 30]

Figure 5:
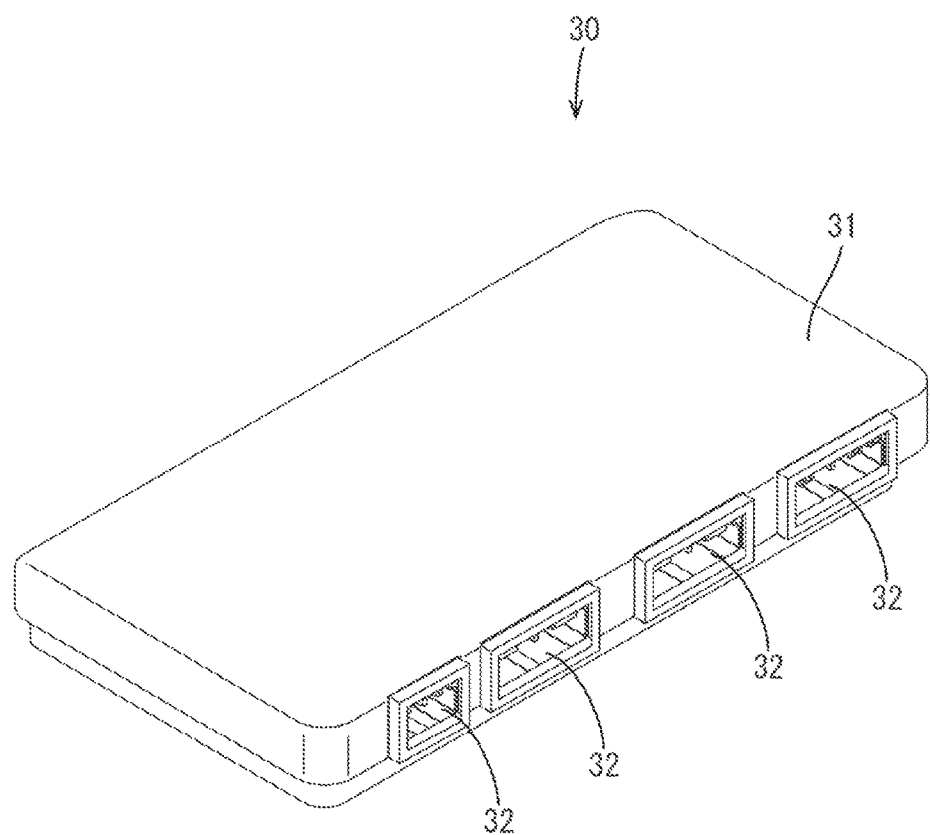
FIG. 5 is a perspective view of an ECU.
Figure 6:
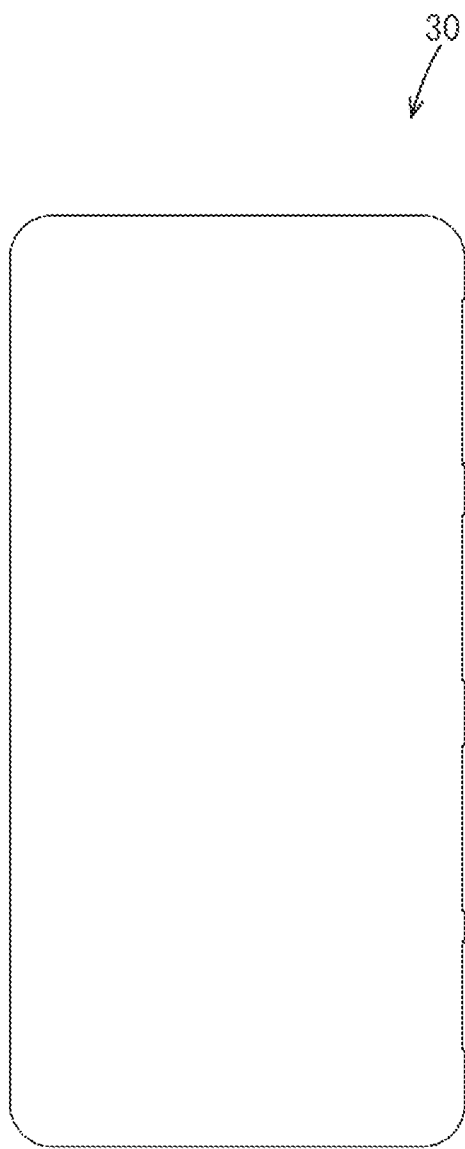
FIG. 6 is a top view of the ECU.

The ECU 30 has functions of detecting the voltages of the electric storage components 11 and controlling charge and discharge of the electric storage components 11. As illustrated in FIG. 5, the ECU 30 includes a case 31, a circuit board (not illustrated), and connectors for connection to external devices. The circuit board and the connectors are disposed inside the case 31. Four connectors among the connectors are ECU connectors 32 for connections to the electric storage modules 10A and 10B.

As illustrated in FIG. 1, the ECU 30 is attached to the electric storage module 10B via the bracket 110 along the surface of the electric storage module 10B on the side on which the wire module 14 is disposed (an upper surface 10T corresponding to another surface). The ECU connectors 32 are in a surface of the case 31 (a surface perpendicular to the terminal disposing surfaces 10F and the wire modules 14 of the electric storage modules 10A and 10B to which the ECU 30 is attached).

[Electric Junction Box 40]

Figure 7:
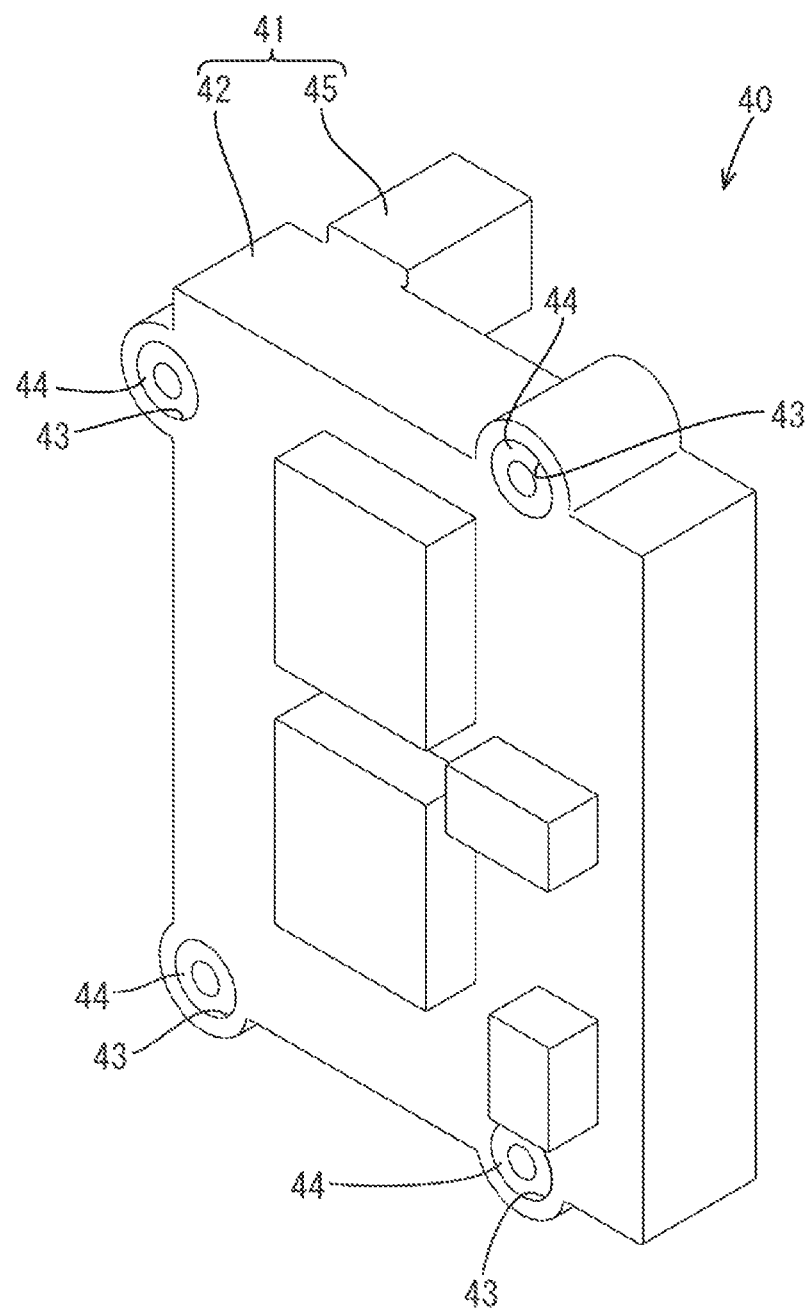
FIG. 7 is a perspective view of an electric junction box.

The electric junction box 40 is a component for controlling power supply (power feed and power shut-off) from the electric storage modules 10A and 10B. As illustrated in FIG. 7, the electric junction box 40 includes a case 41 made of synthetic resin. The case 41 includes a case body 42 and columnar portions 45. The case body 42 holds a circuit board including switching components and fuses therein. The columnar portions 45 protrude from the case body 42.

Figure 8:
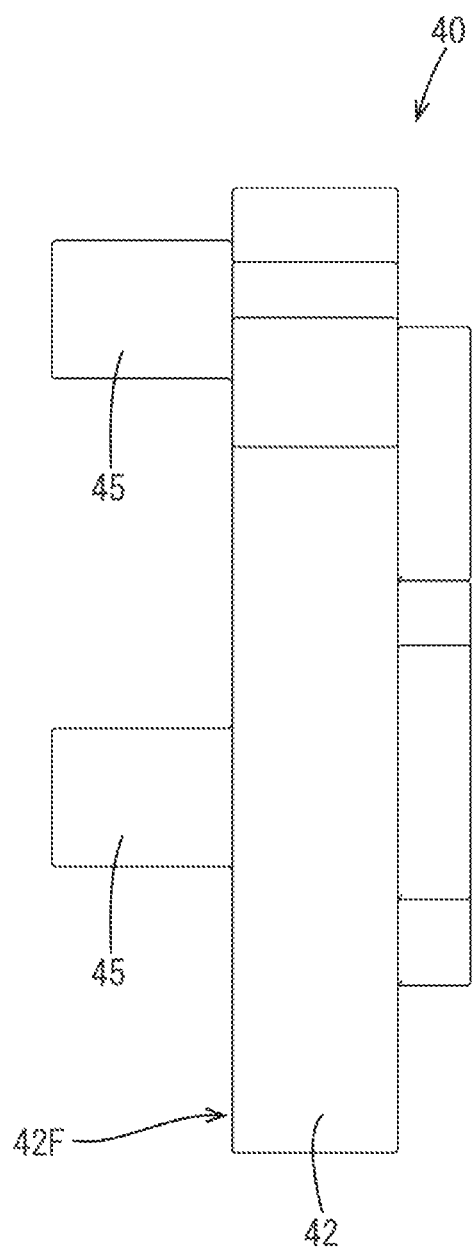
FIG. 8 is a side view of the electric junction box.
Figure 9:
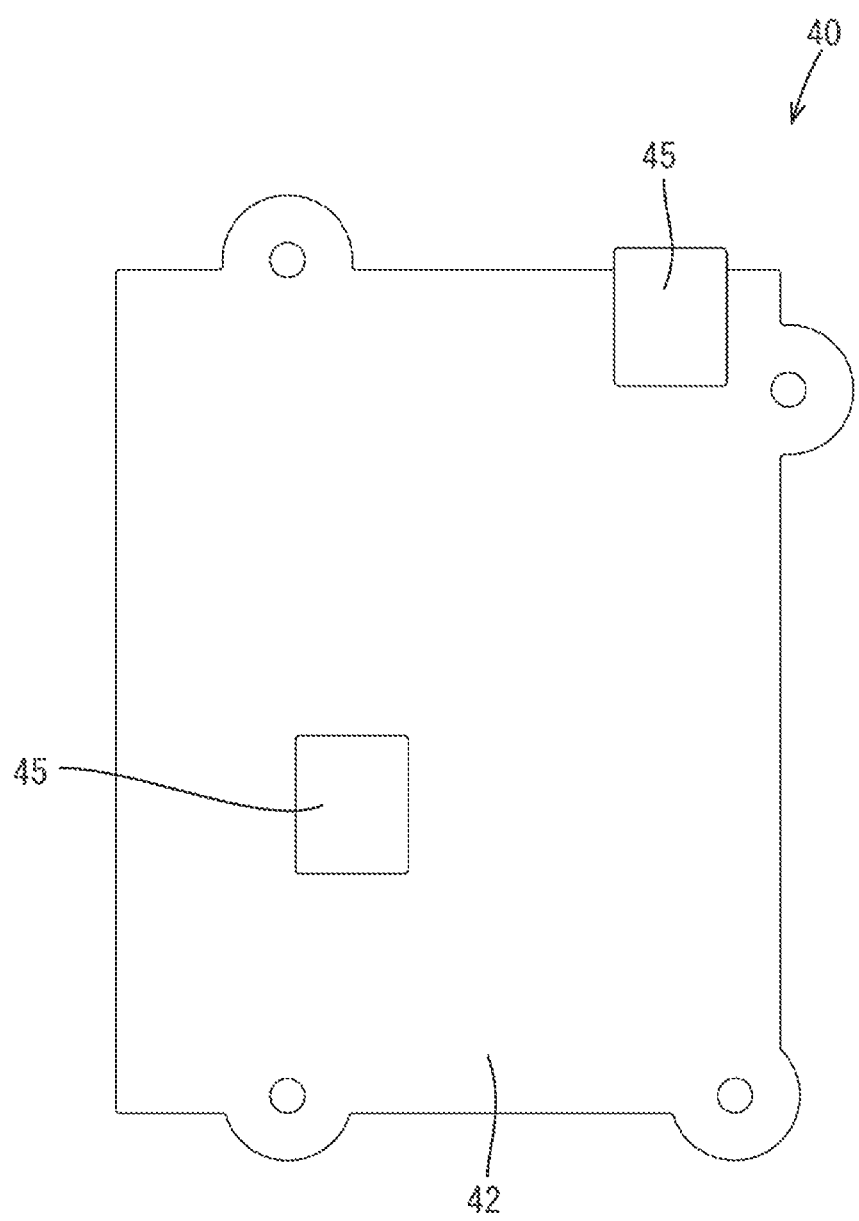
FIG. 9 is a rear view of the electric junction box.
Figure 30:
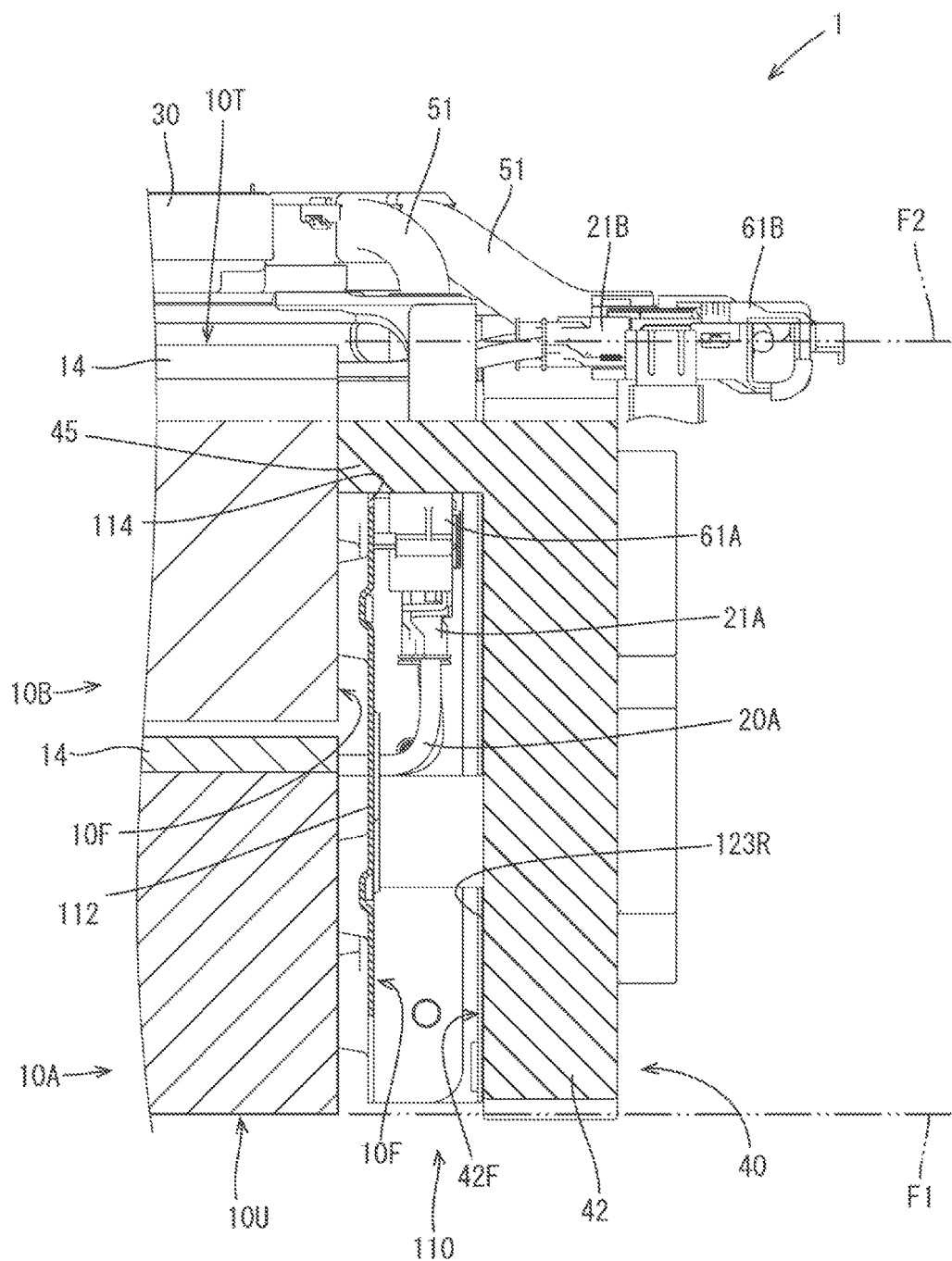
FIG. 30 is a cross-sectional view along line E-E in FIG. 29.
Figure 31:
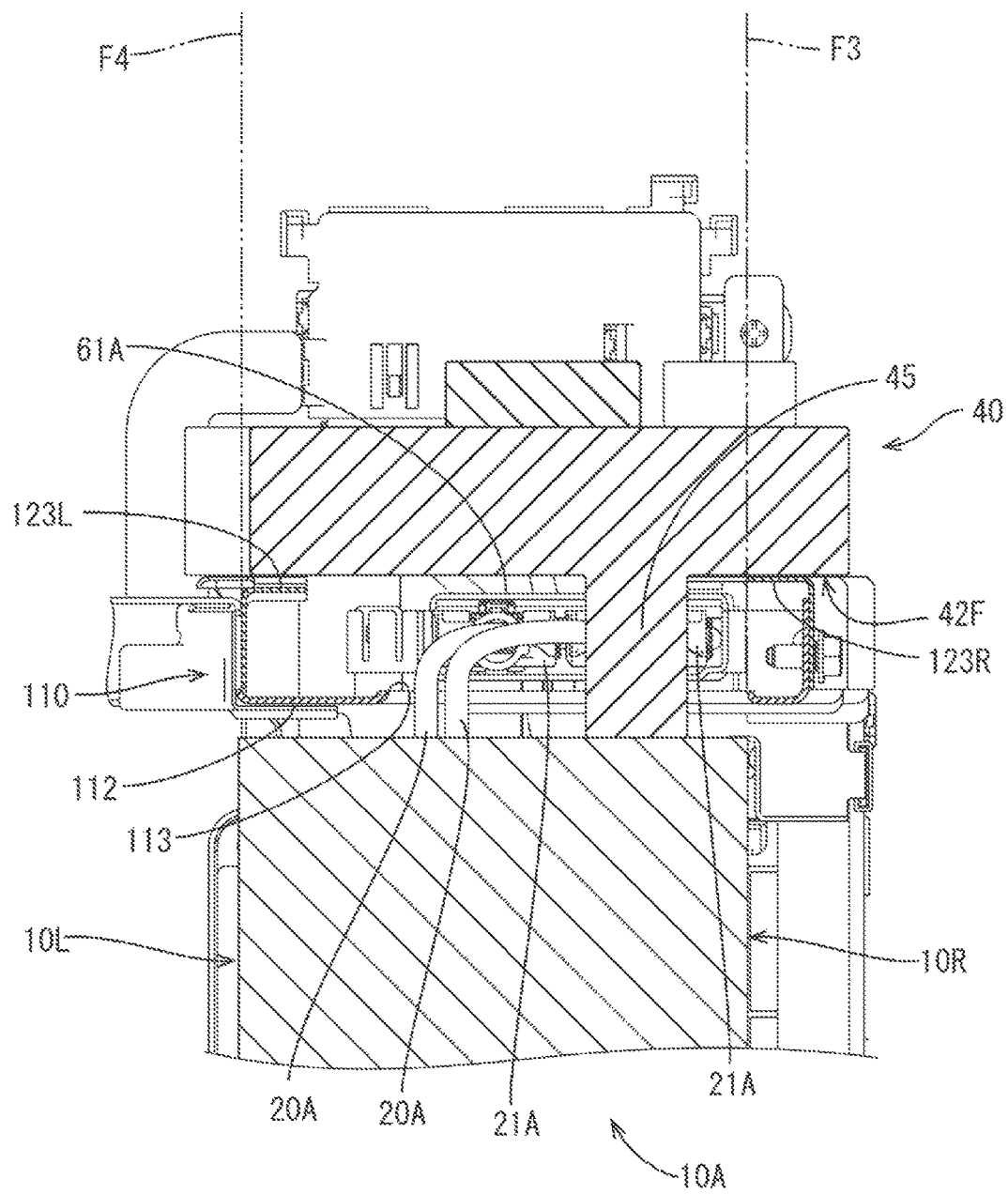
FIG. 31 is a cross-sectional view along line F-F in FIG. 29.

The case body 42 has a flat cuboid overall shape. As illustrated in FIGS. 8, 30, and 31, a surface of the case body 42 is an opposed surface 42F opposed to the terminal disposing surfaces 10F when the case body 42 is attached to the electric storage modules 10A and 10B. As illustrated in FIG. 7, the case body 42 includes four mounting holes 43. The mounting holes 43 are disposed at corners of the case body 42 or portions closer to the corners, respectively. Collars 44 are fitted in the mounting holes 43, respectively. The collars 44 are tubular members made of metal and in which bolts B for fixing the electric junction box 40 to the bracket 110 are inserted, respectively.

As illustrated in FIG. 8, the columnar portions 45 protrude from the opposed surface 42F in a direction perpendicular to the opposed surface 42F.

[Connecting Unit 50]

Figure 10:
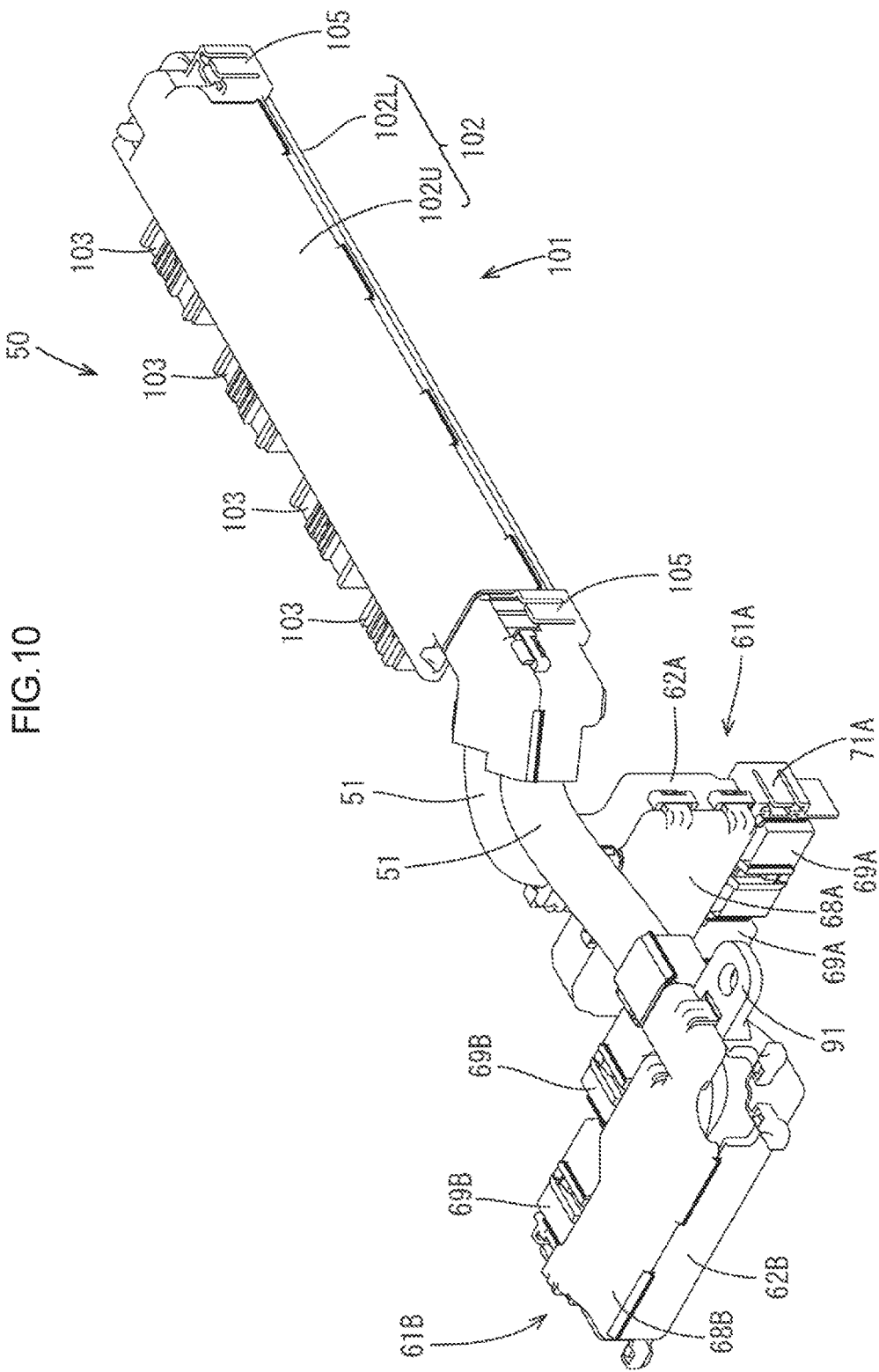
FIG. 10 is a perspective view of a connecting unit.

As illustrated in FIG. 10, the connecting unit 50 includes two second wire harnesses 51, two second connectors 61A and 61B, and a third connector 101. The second connectors 61A and 61B are connected to the second wire harnesses 51, respectively. The third connector 101 is connected to the second wire harnesses 61A and 61B.

Each of the second wire harnesses 51 is a component having a known configuration including a bundle of electric wires and an insulating sheath collectively covering the electric wires, which are not illustrated in detail.

The second connectors 61A and 61B are connected with the ends of the second wire harnesses 51, respectively. The second connector 61A is fitted on the first connector 21A and the second connector 61B is fitted on the first connector 21B. Other ends of the second wire harnesses 51 are bundled and connected with the third connector 101.

As illustrated in FIG. 10, the second connector 61A includes a case portion 62A, a cover portion 68A, and two hood portions 69A.

Figure 11:
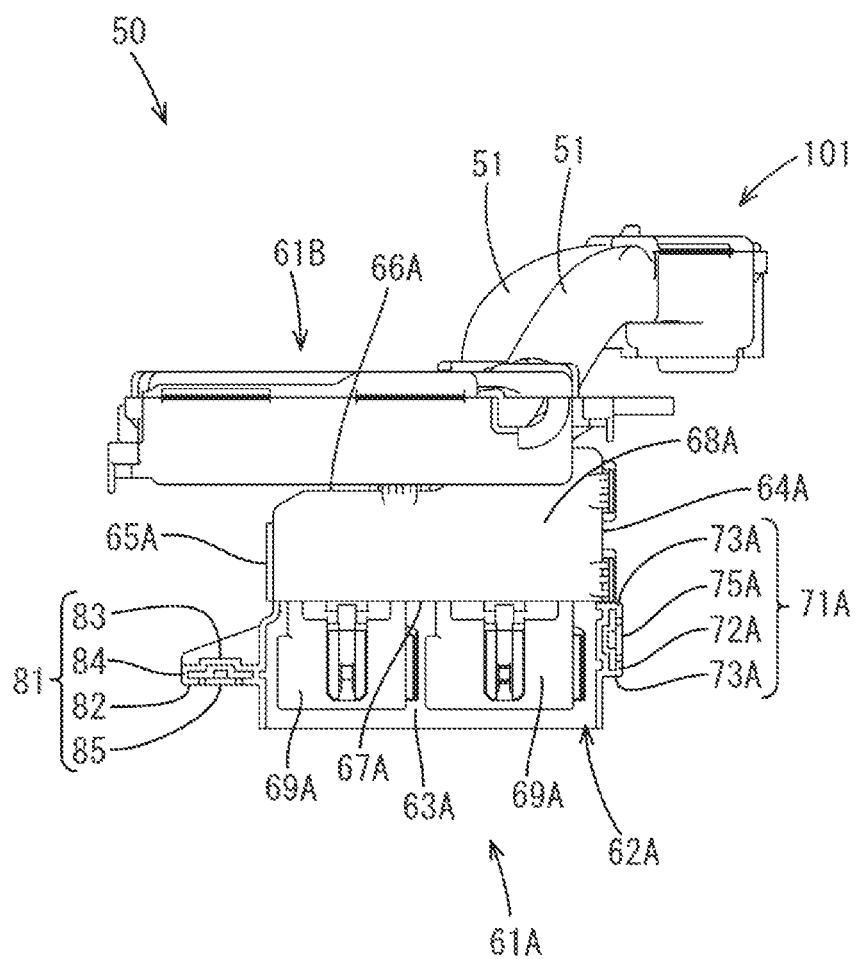
FIG. 11 is a front view of the connecting unit.
Figure 12:
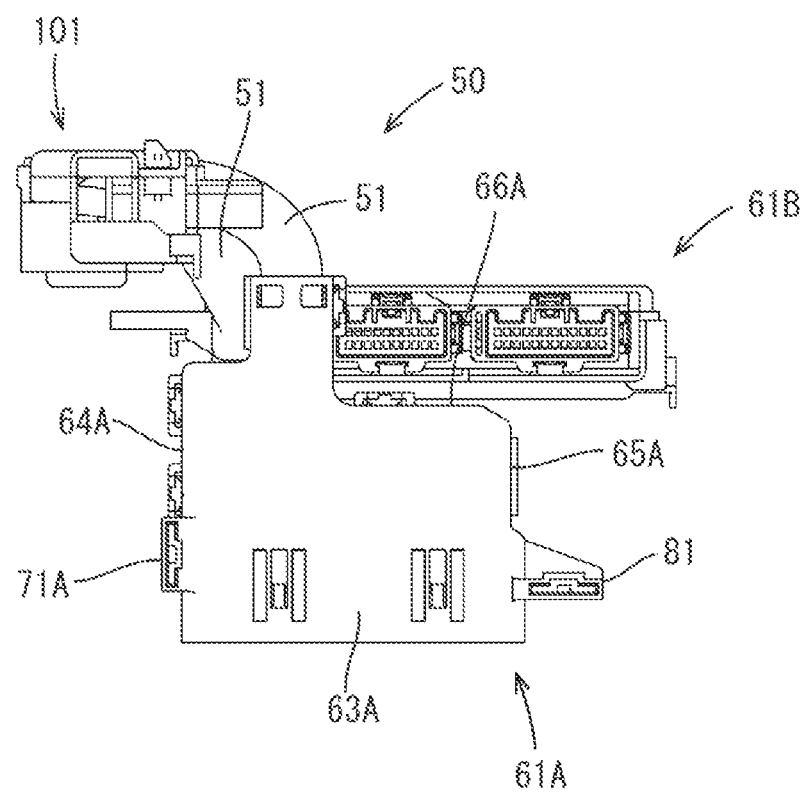
FIG. 12 is a rear view of the connecting unit.

The case portion 62A has a tray shape. As illustrated in FIGS. 11 and 12, the case portion 62A includes a bottom wall 63A, two sidewalls 64A and 65A, a back wall 66A, and a middle wall 67A. The bottom wall 63A has a rectangular plate shape. The sidewalls 64A and 65A project from short edges of the bottom wall 63A in a direction perpendicular to the bottom wall 63A. The back wall 66A projects from one of the long edges of the bottom wall 63A in a direction perpendicular to the bottom wall 63A. The middle wall 67A projects from the bottom wall 63A at about the middle of the long dimension of the bottom wall 63A in a direction perpendicular to the bottom wall 63A to be parallel to the back wall 66A. The cover portion 68A has a rectangular plate shape. A section of the bottom wall 63A, the sidewalls 64A and 65A, the back wall 66A, and the middle wall 67A define a box shape with an opening on an opposite side from the bottom wall 63A. The cover portion 68A is attached to the case portion 62A to cover the opening. The end of the second wire harness 51 is disposed in a space defined by the case portion 62A and the cover portion 68A.

As illustrated in FIG. 11, each of the hood portions 69A has a rectangular tubular shape and extends from the middle wall 67A to an opposite side from the back wall 66A. The hood portions 69A are configured to receive the connector bodies 23 of the first connectors 21A. Terminal fittings (not illustrated) are disposed to pass through the middle wall 67A. The terminal fittings are press-fitted on the ends of the electric wires included in the second wire harness 51.

As illustrated in FIG. 11, the case portion 62A includes two locking portions 71A and 81 to be fixed to the bracket 110.

The locking portion 71A of two locking portions 71A and 81 includes a locking wall 72A and two connecting walls 73A. The locking wall 72A is a rectangular plate shaped portion separated from the sidewall 64A of two sidewalls 64A and 65A of the case portion 62A and parallel to the sidewall 64A. Each of the connecting walls 73A connects the corresponding side edge of the locking wall 72A perpendicular to the bottom wall 63A to the sidewall 64A. The locking wall 72A includes a flexible tab 75A. The locking wall 72A includes two slits 74A that extend from one of side edges perpendicular to the sidewall 64A toward the other one of the side edges. A section between the slits 74A is the flexible tab 75A that is flexible to get closer to and away from the sidewall 64A. The flexible tab 75A includes a locking protrusion 76A that protrudes toward the sidewall MA (see also FIG. 27).

The locking portion 81 includes a locking wall 82, a holding wall 83, and a connecting wall 84. The locking wall 82 is a rectangular plate shaped portion that extends from the sidewall 65A of two sidewalls 64A and 65A of the case portion 62A. The locking wall 82 is disposed in a position perpendicular to the sidewall 65A and the bottom wall 63A. The holding wall 83 is a wall that extends from the sidewall 65A. The holding wall 83 is disposed parallel to the locking wall 82 and separated from the locking wall 82. The connecting wall 84 connects distal ends of the locking wall 82 and the holding wall 83 with each other. A flexible tab 85 has a shape similar to the flexible tab 75A of the locking portion 71A. The flexible tab 85 is flexible to get closer to and away from the holding wall 83. The flexible tab 85 includes a locking protrusion 86 that protrudes toward the holding wall 83 (see also FIG. 28).

The second connector 61B includes a case portion 62B and a cover portion 68B that have shapes slightly different those of the second connector 61A. Furthermore, the second connector 61B includes a mounting tab 91 instead of the locking portion 81. Other configurations are similar to those of the second connector 61A. The portions of the second connector 61B having configurations similar to those of the second connector 61A will be denoted by the same numerals with letter B instead of letter A and will not be described.

Figure 13:
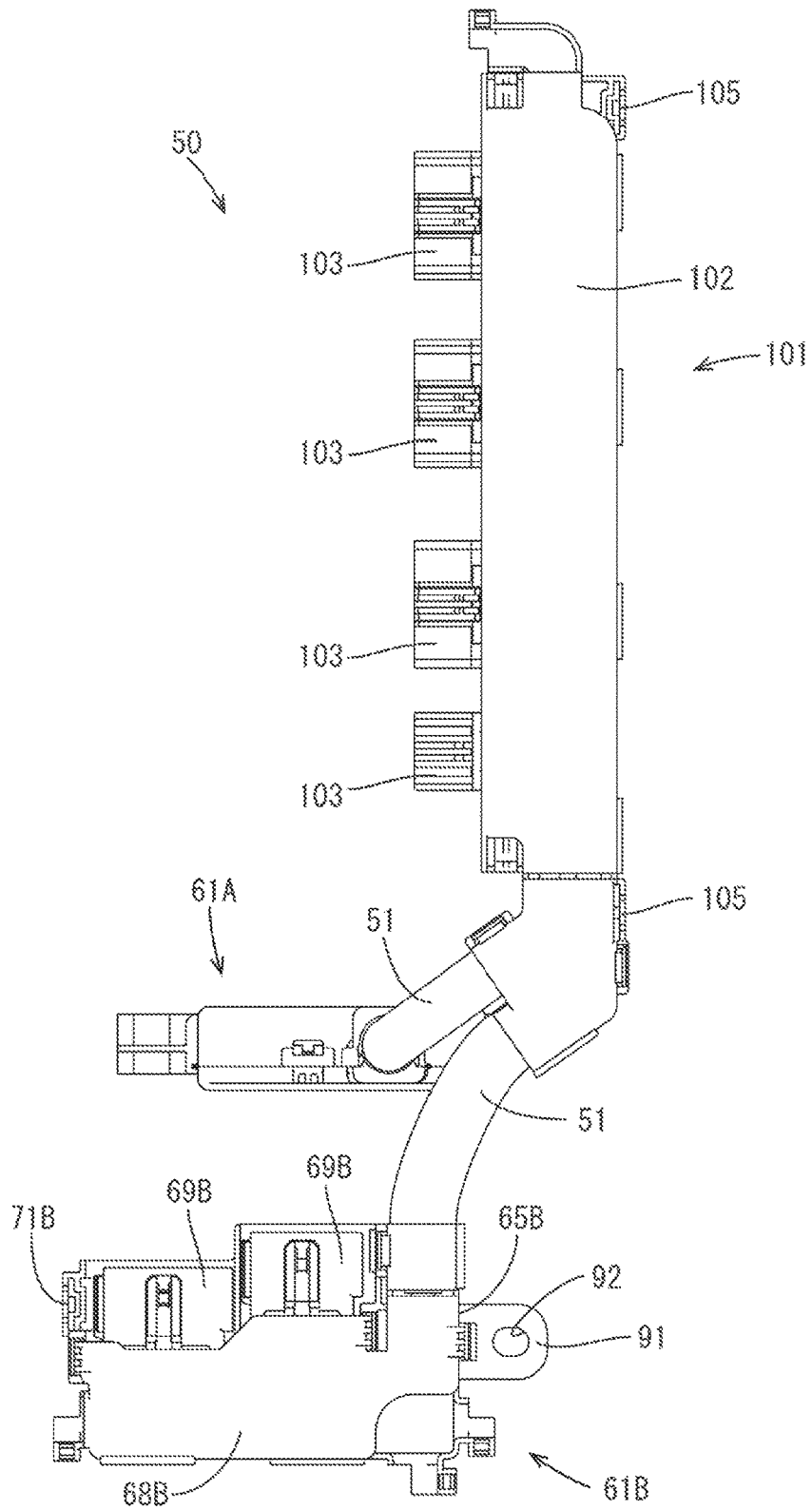
FIG. 13 is a top view of the connecting unit.

As illustrated in FIGS. 10 and 13, the mounting tab 91 is a plate shaped tab that extends outward from the sidewall 65B of the case portion 62B. The mounting tab 91 includes a screw hole 92 through which a screw S for fixing the second connector 61B to the bracket 110 is passed.

The third connector 101 is connected to the ECU 30. As illustrated in FIG. 10, the third connector 101 includes a wire cover portion 102 and four connector bodies 103. The wire cover portion 102 collectively covers ends of the second wire harnesses 51. The wire cover portion 102 includes two divided covers 102U and 102L that are attached to each other to form a rectangular groove shape as a whole.

Figure 15:
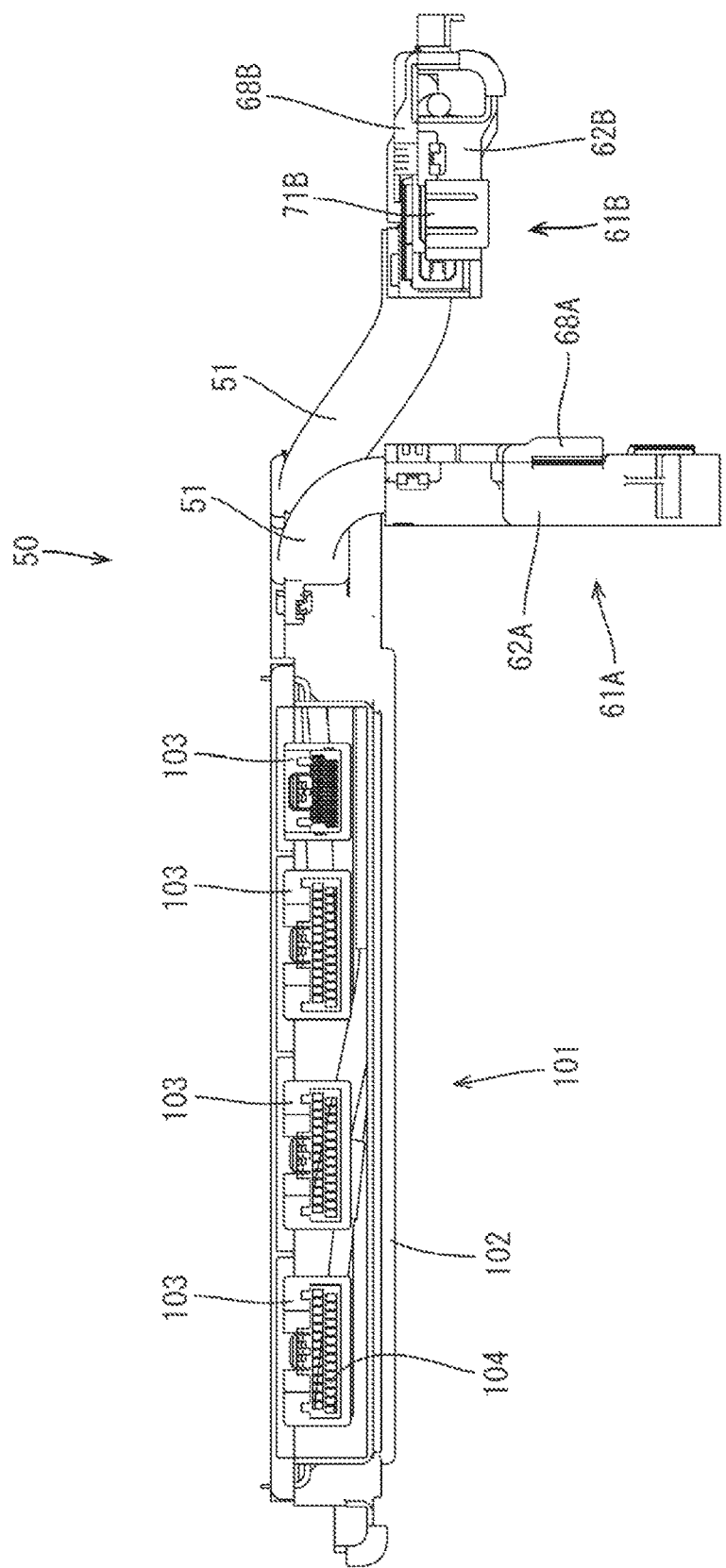
FIG. 15 is a left side view of the connecting unit.

The connector bodies 103 are fitted in the ECU connectors 32 of the ECU 30, respectively. As illustrated in FIGS. 13 and 15, the connector bodies 103 protrude outward from the wire cover portion 102. Each connector body 103 has a cuboid overall shape. Each connector body 103 includes cavities 104 that can hold terminal fittings therein. The terminal fittings disposed in the cavities 104 are press-fitted on the ends of the electric wires included in the second wire harnesses 51.

Figure 14:
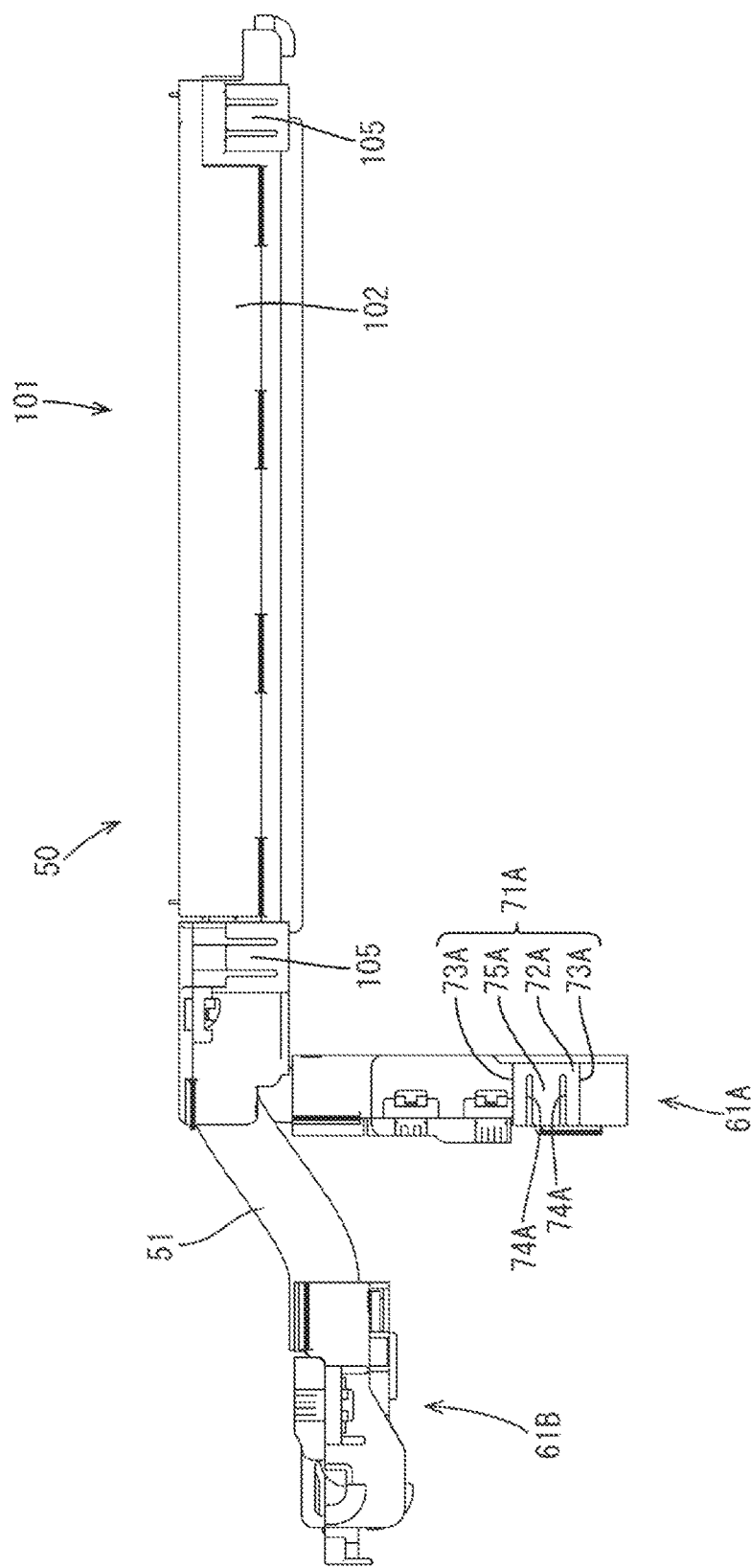
FIG. 14 is a right side view of the connecting unit.

As illustrated in FIGS. 10 and 14, the wire cover portion 102 includes two locking portion 105 to be fixed to the bracket 110. Each locking portion 105 has a configuration similar to that of the locking portion 71A of the second connector 61A.

[Bracket 110]

Figure 16:
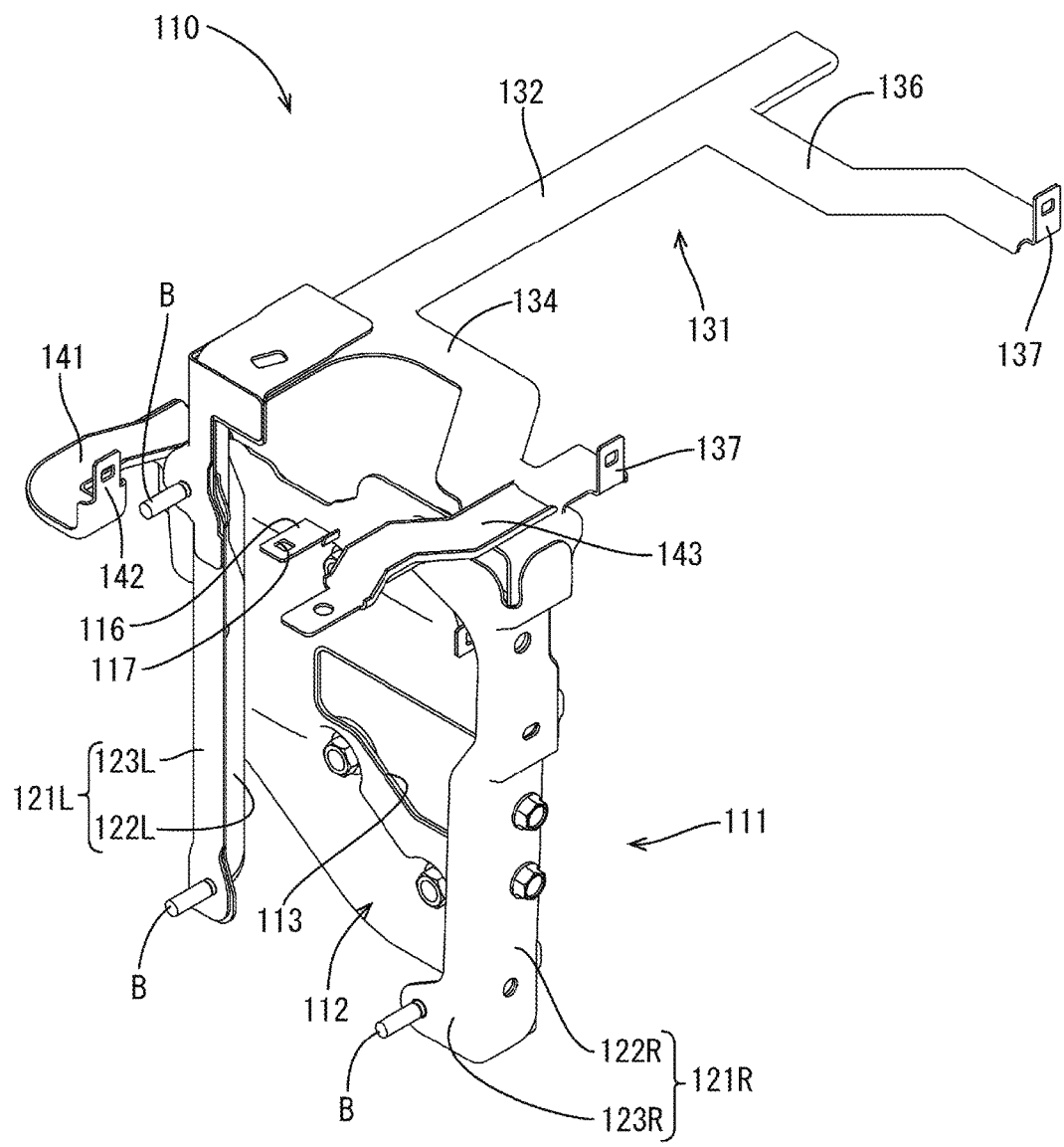
FIG. 16 is a perspective view of a bracket.

The bracket 110 is for mounting the ECU 30, the electric junction box 40, and the connecting unit 50 to the electric storage modules 10A and 10B. As illustrated in FIG. 16, the bracket 110 includes a main frame 111, two side frames 121R and 121L, an ECU mounting portion 131, and two connecter supporting frames 141 and 143. The main frame 111 is fixed to the electric storage modules 10A and 10B. The side frames 121R and 121L extending from the main frame 111 are fixed to the electric junction box 40. The ECU mounting portion 131 extends from the main frame 111. The ECU 30 and the third connector 101 are fixed to the ECU mounting portion 131. The second connector 61B is fixed to the connector supporting frame 141 and 143.

Figure 17:
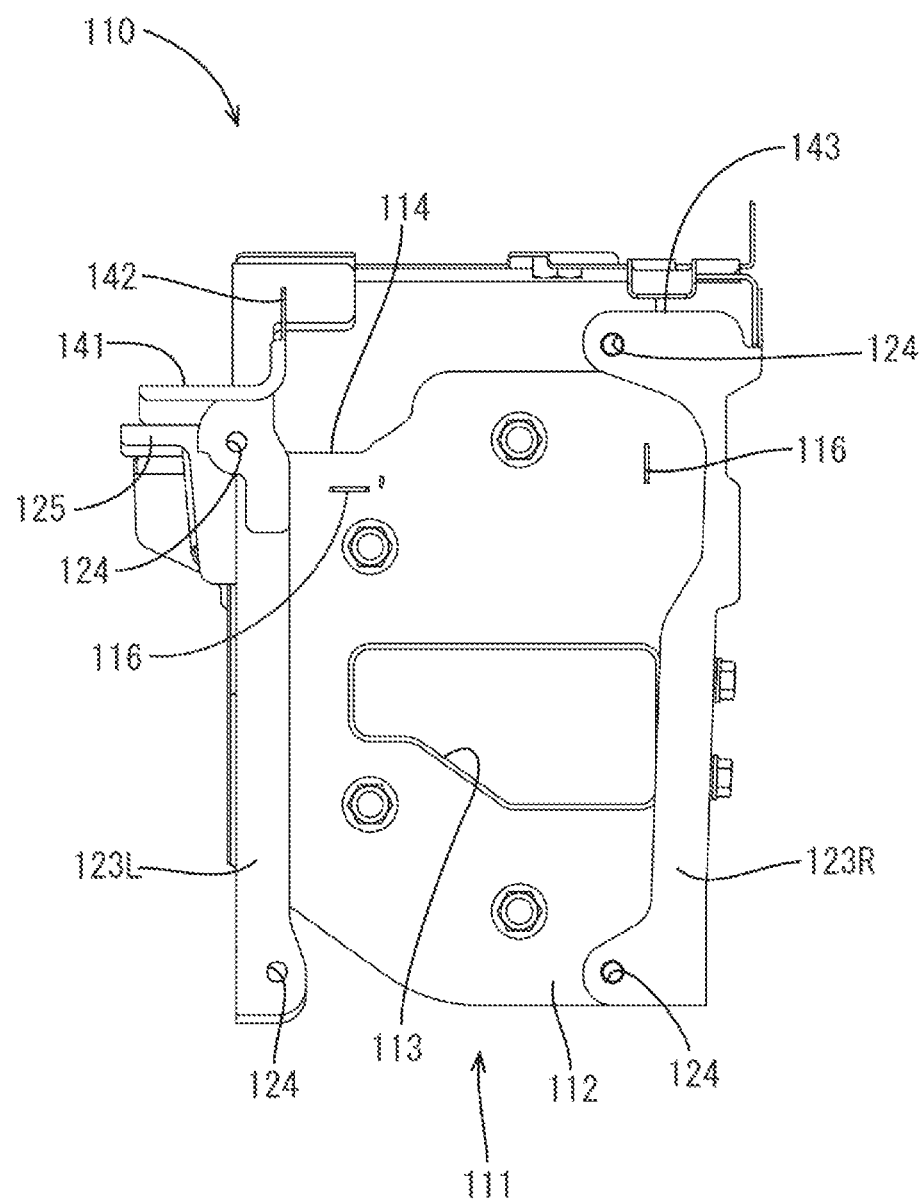
FIG. 17 is a front view of the bracket.
Figure 18:
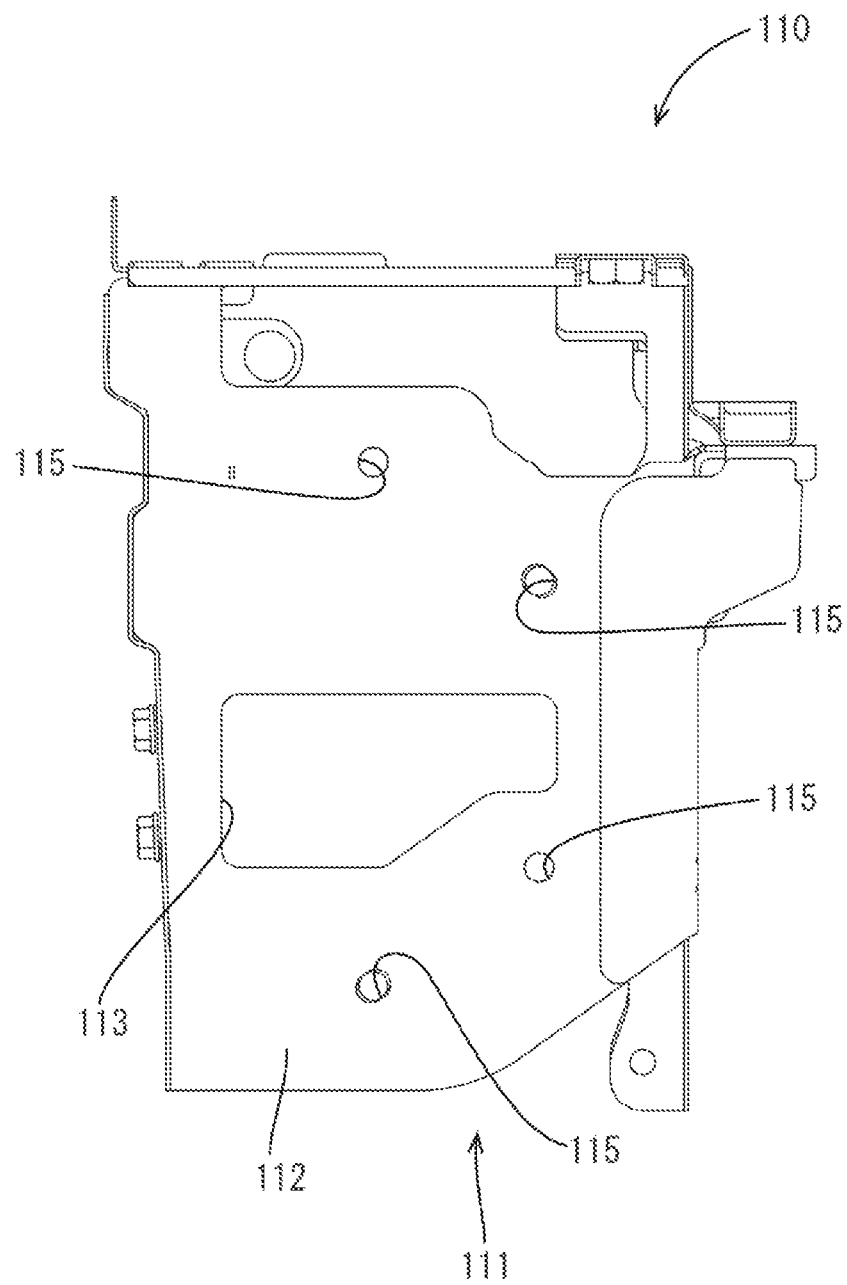
FIG. 18 is a rear view of the bracket.

As illustrated in FIGS. 16, 17, and 18, the main frame 111 includes a frame body 112 and two locking tabs 116. The frame body 112 includes a window 113, a cutout 114, and terminal insertion holes 115.

The frame body 112 is a portion that has a rectangular plate overall shape. The frame body 112 is disposed along the terminal disposing surfaces 10F of the electric storage modules 10A and 10B. The window 113 is a through hole that extends from a surface of the frame body 112 opposed to the terminal disposing surface 10F to an opposite surface from the surface of the frame body 112. The window 113 is located at about the middle of the frame body 112. The first wire harnesses 20A and one of the columnar portions 45 of the electric junction box 40 can be passed through the window 113. The cutout 114 is a recessed portion as if one of corners of the frame body 112 adjacent to the wire module 14 of the electric storage module 10B is cut off. The other one of the columnar portions 45 of the electric junction box 40 can be disposed therein. The terminal insertion holes 115 are through holes that extends from the surface of the frame body 112 opposed to the terminal disposing surface 10F to the opposite surface from the surface of the frame body 112. The output terminals 13 of the electric storage modules 10A and 10B can be passed through the terminal insertion holes 115, respectively.

Each of the locking tabs 116 is a rectangular plate that extends perpendicular to the frame body 112 and in an opposite direction from the electric storage modules 10A and 10B. The locking tabs 116 include locking holes 117 that are through holes that run from one of plate surfaces to the other one of the plate surfaces. The locking portions 71A and 81 of the second connector 61A are fitted in the locking holes 117, respectively.

The side frame 121R of two side frames 121R and 121L includes a side plate portion 122R and a junction box mounting plate 123R. The side plate portion 122R extends from one of long edges of the frame body 112 (edges perpendicular to the wire module 14 when attached to the electric storage modules 10A and 10B). The side plate portion 122R project perpendicular to the frame body 112 and in an opposite direction from the electric storage module 10A and 10B. The junction box mounting plate 123R is disposed parallel to and separated from the frame body 112. The junction box mounting plate 123R extends from the side plate portion 122R. The junction box mounting plate 123R includes two bolt insertion holes 124 into which bolts B for mounting of the electric junction box 40 are inserted. The side frame 121L extends from the other one of the long edges of the frame body 112. Similar to the side frame 121R, the side frame 121L includes a side plate portion 122L and a junction box mounting plate 123L that includes two bolt insertion holes 124. The side frame 121R further includes a supporting frame mounting tab 125. The supporting frame mounting tab 125 is a plate that extends from the side plate portion 122L in an opposite direction from the frame body 112.

Figure 19:
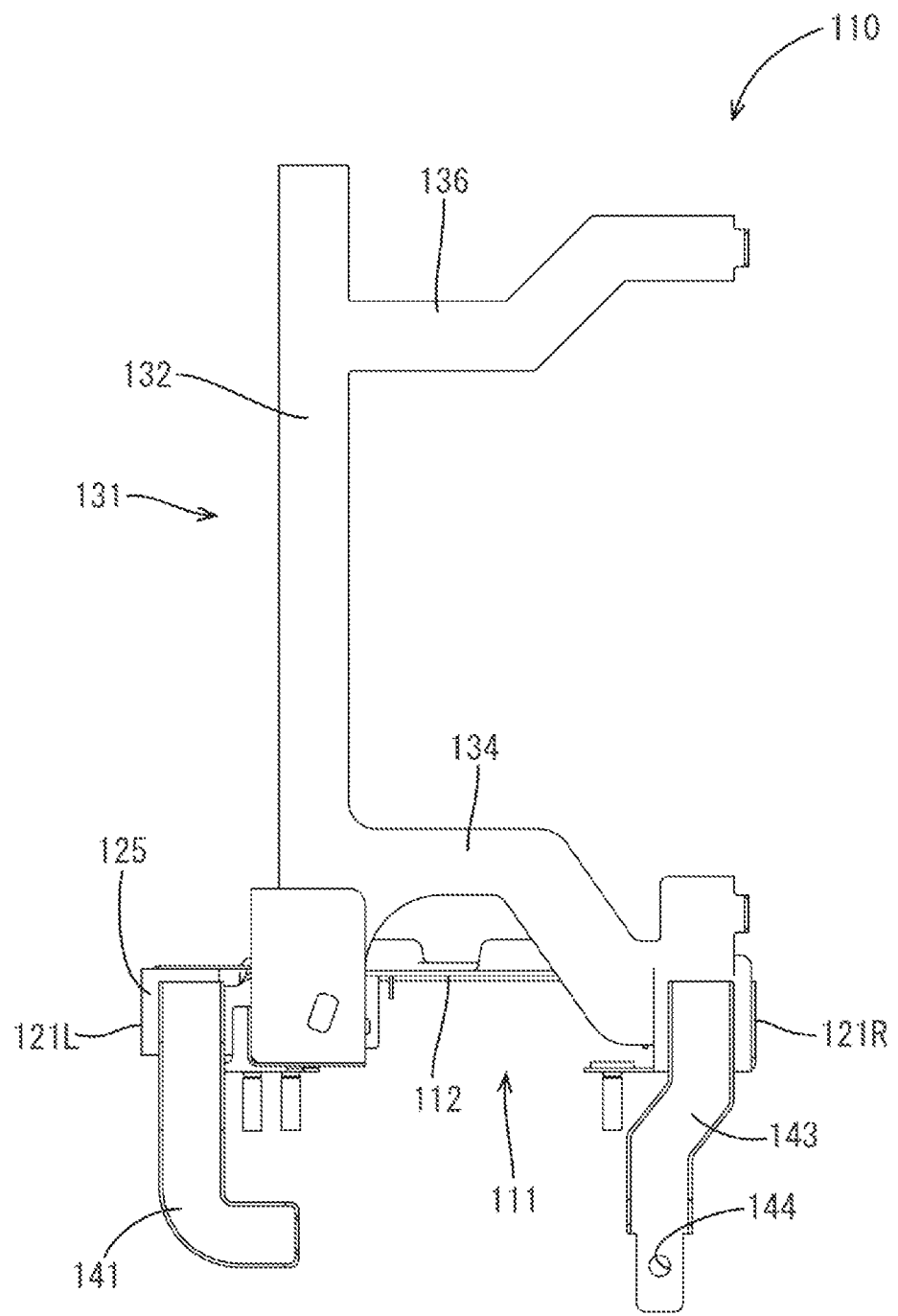
FIG. 19 is a top view of the bracket.
Figure 20:
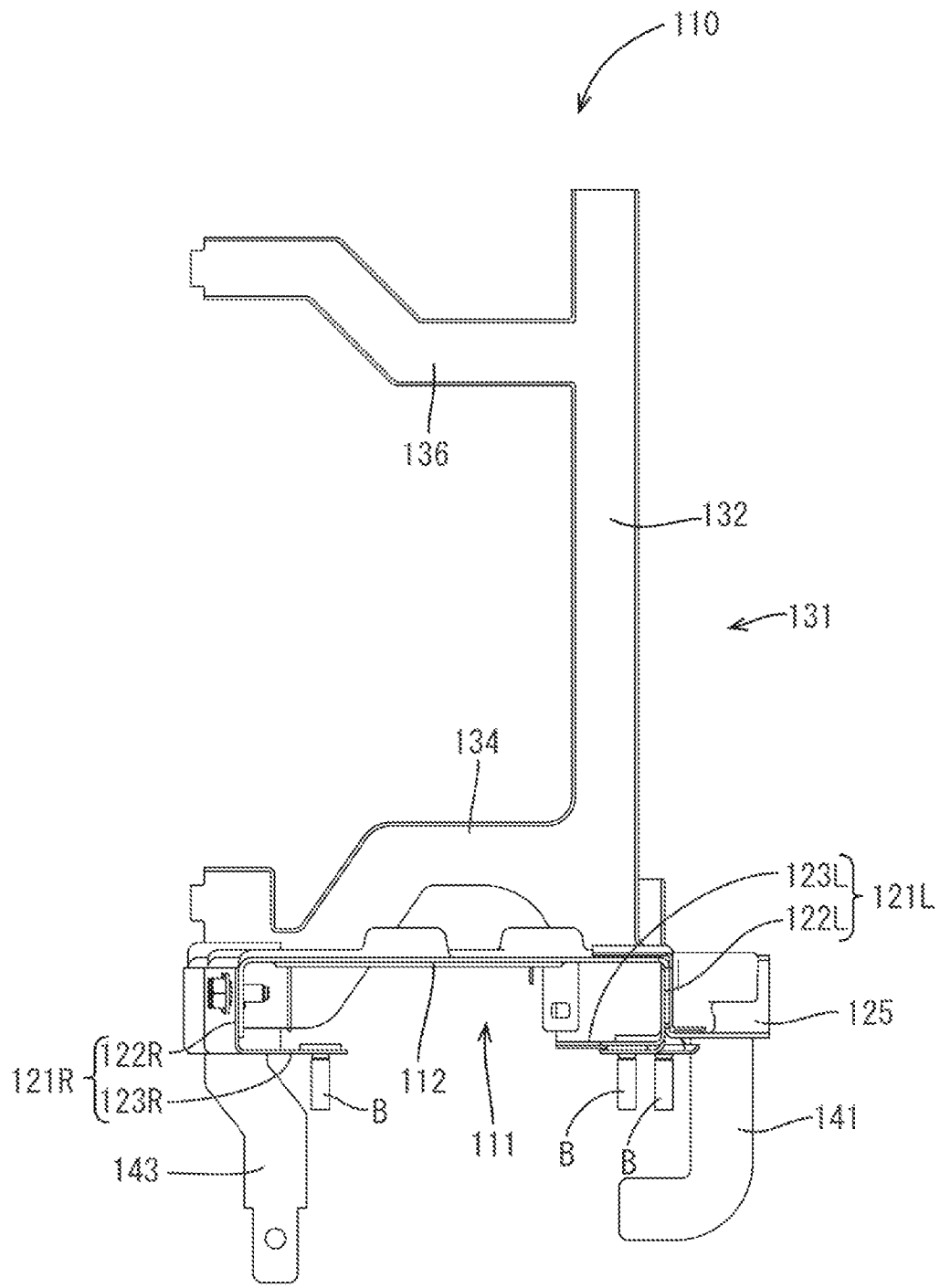
FIG. 20 is a bottom view of the bracket.

The ECU mounting portion 131 is disposed along the wire module 14 of the electric storage module 10B. The ECU mounting portion 131 extends from the frame body 112. As illustrated in FIGS. 16, 19, and 20, the ECU mounting portion 131 includes a main frame portion 132, two auxiliary frame portions 134 and 136, two locking tabs 137. The auxiliary frame portions 134 extend from the main frame portion 132. The locking tabs 137 extend from the auxiliary frame portions 134 and 136, respectively.

The main frame portion 132 is a band shaped portion that extends perpendicular to the frame body 112. The main frame portion 132 is disposed along one of the long edges of the wire module 14 (the edge perpendicular to the edge that is adjacent to the terminal disposing surface 10F).

The auxiliary frame portion 134 of two auxiliary frame portions 134 and 136 is a band shaped portion that extends in a winding manner along the edge of the wire module 14 adjacent to the terminal disposing surface 10F. A distal end of the auxiliary frame portion 134 is coupled with the side plate portion 122R. The other auxiliary frame portion 136 is a band shape portion that extends from the main frame portion 132 in a winding manner. The auxiliary frame portion 136 is separated from the auxiliary frame portion 134.

Each of the locking tabs 137 has a shape similar to the locking tabs that extend from the frame body 112. The locking tabs 137 extend from distal ends of the respective auxiliary frame portions 134 and 136 in a direction perpendicular to the auxiliary frame portions 134 and 136 and opposite from the electric storage modules 10A and 10B. The locking tabs 137 are engaged with the locking portions 105 of the third connector 101.

As illustrated in FIGS. 16 and 19, the connector supporting frame 141 of two connector supporting frames 141 and 143 is a band shaped portion that extend from the supporting frame mounting tab 125 in a direction perpendicular to the frame body 112. A locking tab 142 extends from a distal end of the connector supporting frame 141. The locking tab 142 has a shape similar to the locking tab 116. The locking tab 142 is engaged with the locking portion 71B of the second connector 61B.

As illustrated in FIGS. 16 and 19, the connector supporting frame 143 is a band shaped portion that extends from a section of the auxiliary frame portion 134 closer to the distal end of the auxiliary frame portion 134 in a direction perpendicular to the frame body 112. The connector supporting frame 143 includes a screw hole 144 in which a screw S for mounting the second connector 61B is inserted.

[Mounting]

Steps of mounting the ECU 30, the electric junction box 40, and the connecting unit 50 to the electric storage modules 10A and 10B that are on top of each other via the bracket 110 will be described.

Figure 21:
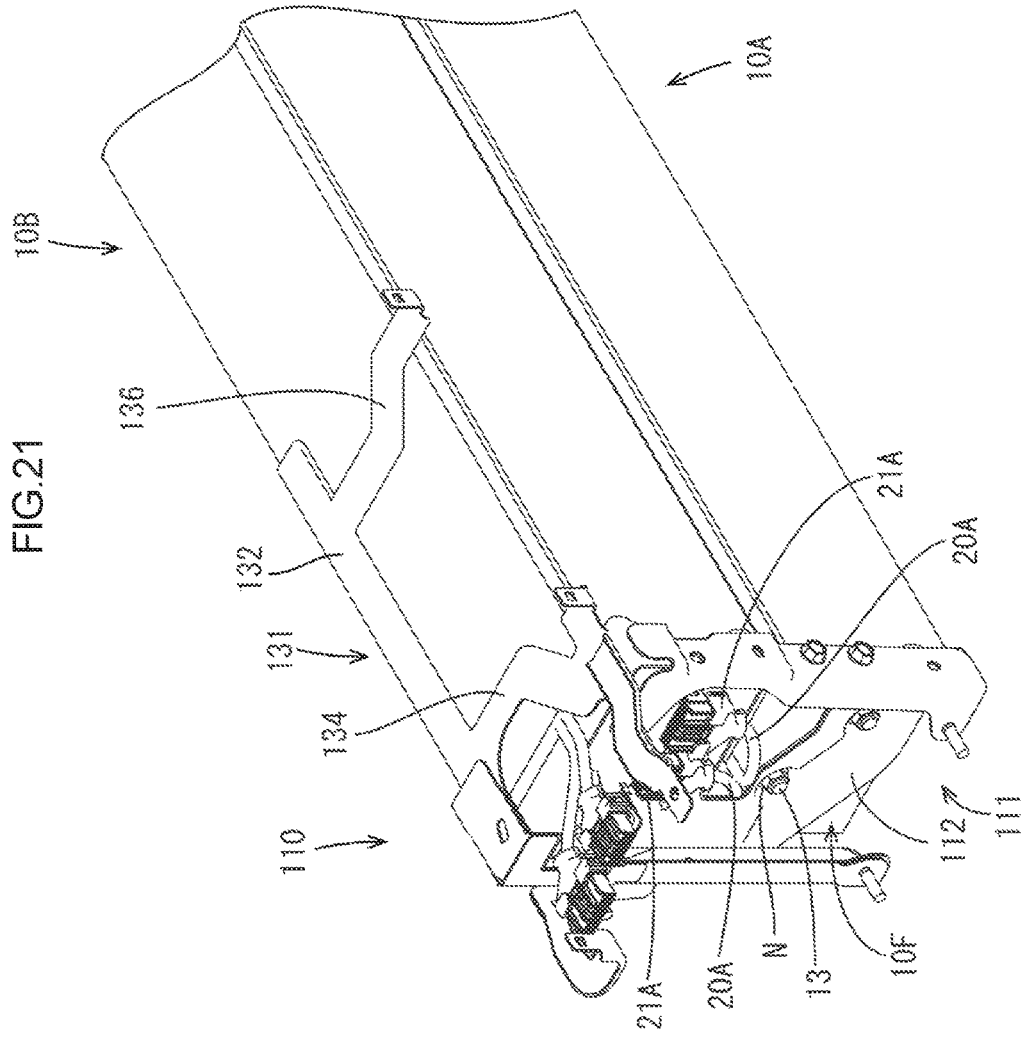
FIG. 21 is a perspective view of the electric storage module with the bracket fixed thereto.

As illustrated in FIG. 21, the bracket 110 is mounted to the electric storage modules 10A and 10B. The bracket 110 is disposed such that the frame body 112 contacts the terminal disposing surfaces 10F of the electric storage modules 10A and 10B and the ECU mounting portion 131 contacts the wire module 14 of the electric storage module 10B. The output terminals 13 are passed through the terminal insertion holes 115 of the frame body 112, respectively. Nuts N are screwed on the ends of the output terminals 13. The first wire harnesses 20A extending from the electric storage module 10A are passed through the window 113 and the first connectors 21A are pulled out to an opposite side from the electric storage module 10A relative to the frame body 112.

Figure 22:
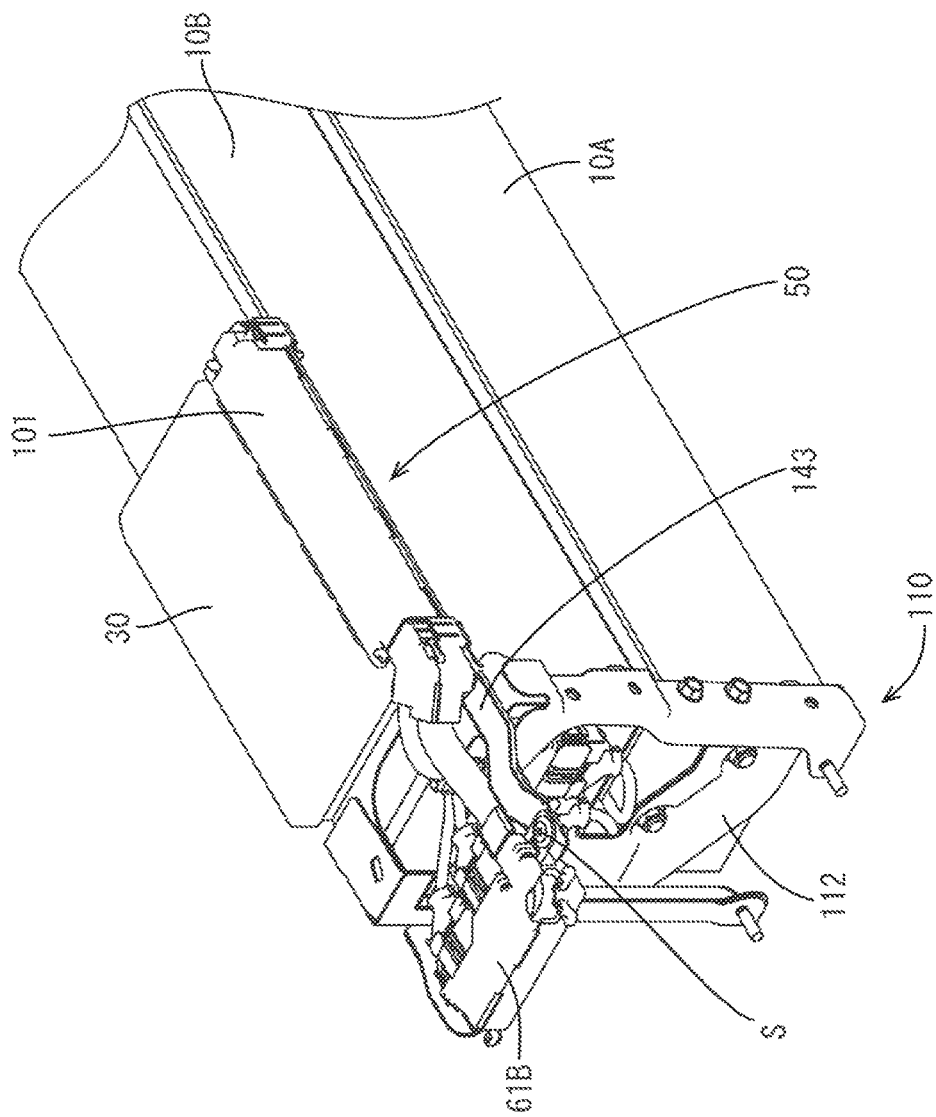
FIG. 22 is a perspective view of the electric storage module with the ECU and the connection unit mounted thereto with the bracket.

Next, the ECU 30 and the connecting unit 50 are mounted to the bracket 110. The connector bodies 103 of the third connector 101 are fitted in the ECU connectors 32 of the ECU 30, respectively. As illustrated in FIG. 22, the ECU 30 and the connecting unit 50 that are attached together are mounted to the bracket 110.

Figure 24:
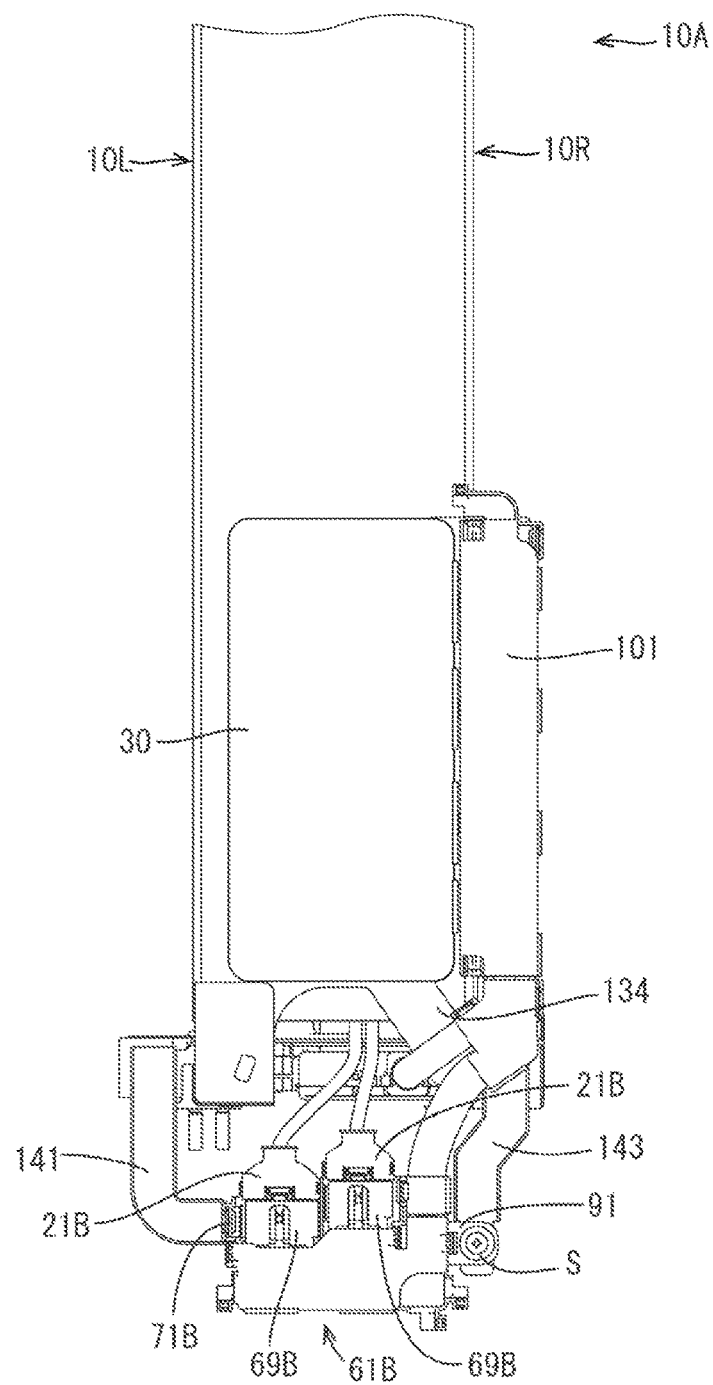
FIG. 24 is a top view of the electric storage module with the ECU and the connection unit mounted thereto with the bracket.
Figure 25:
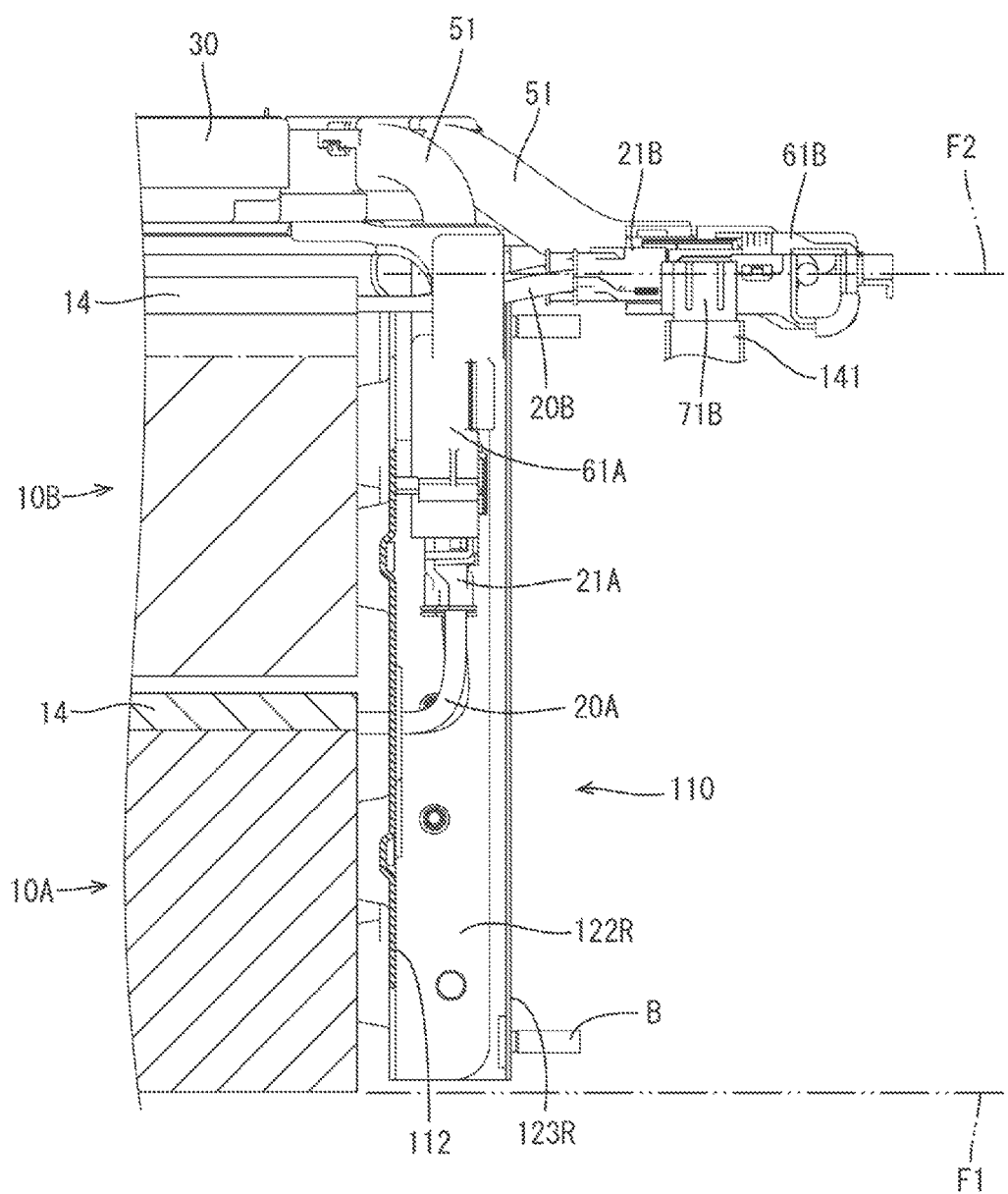
FIG. 25 is a cross-sectional view along line A-A in FIG. 23.
Figure 26:
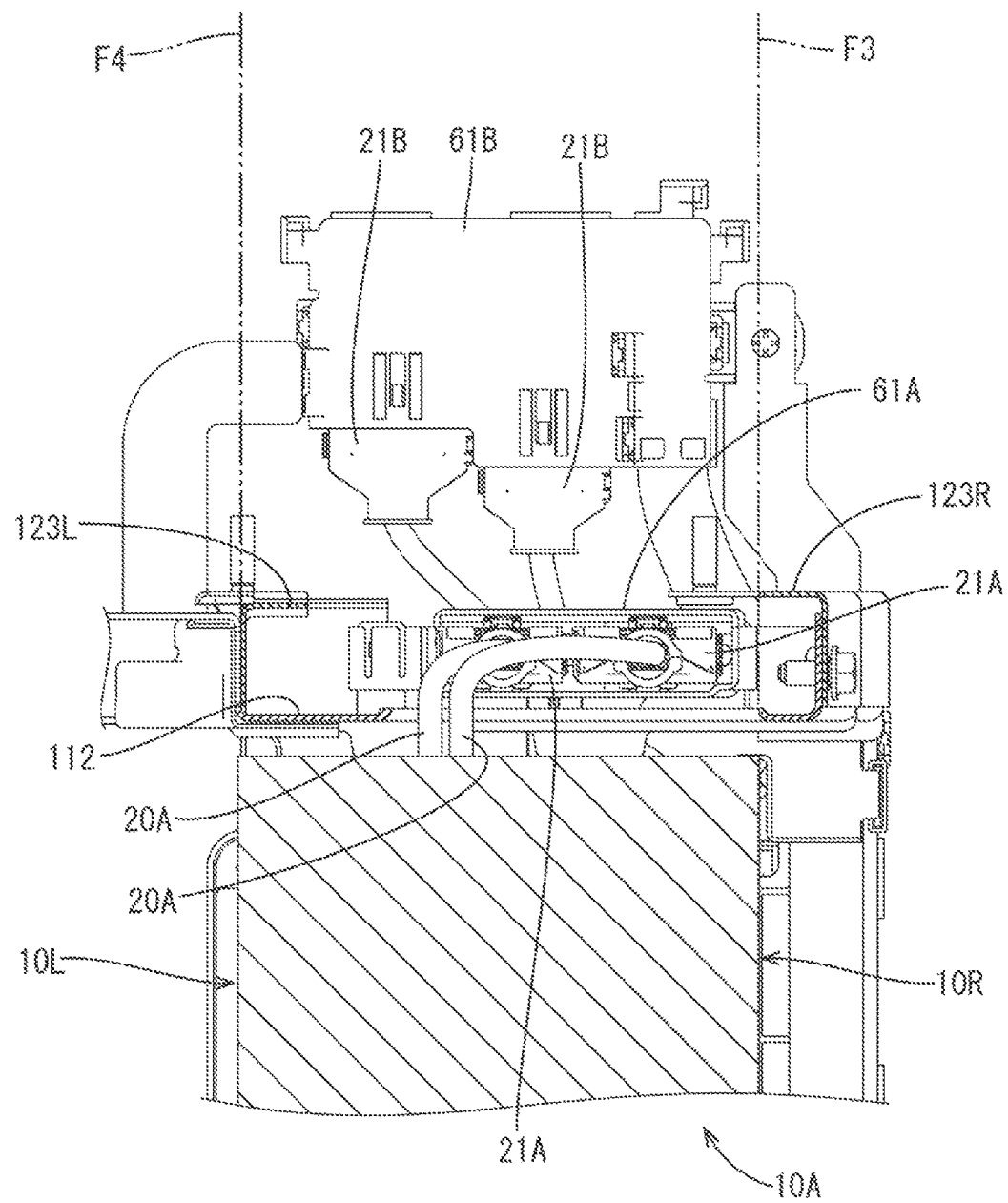
FIG. 26 is a cross-sectional view along line B-B in FIG. 23.

As illustrated in FIG. 24, the ECU 30 is fixed to the ECU mounting portion 131.

Figure 23:
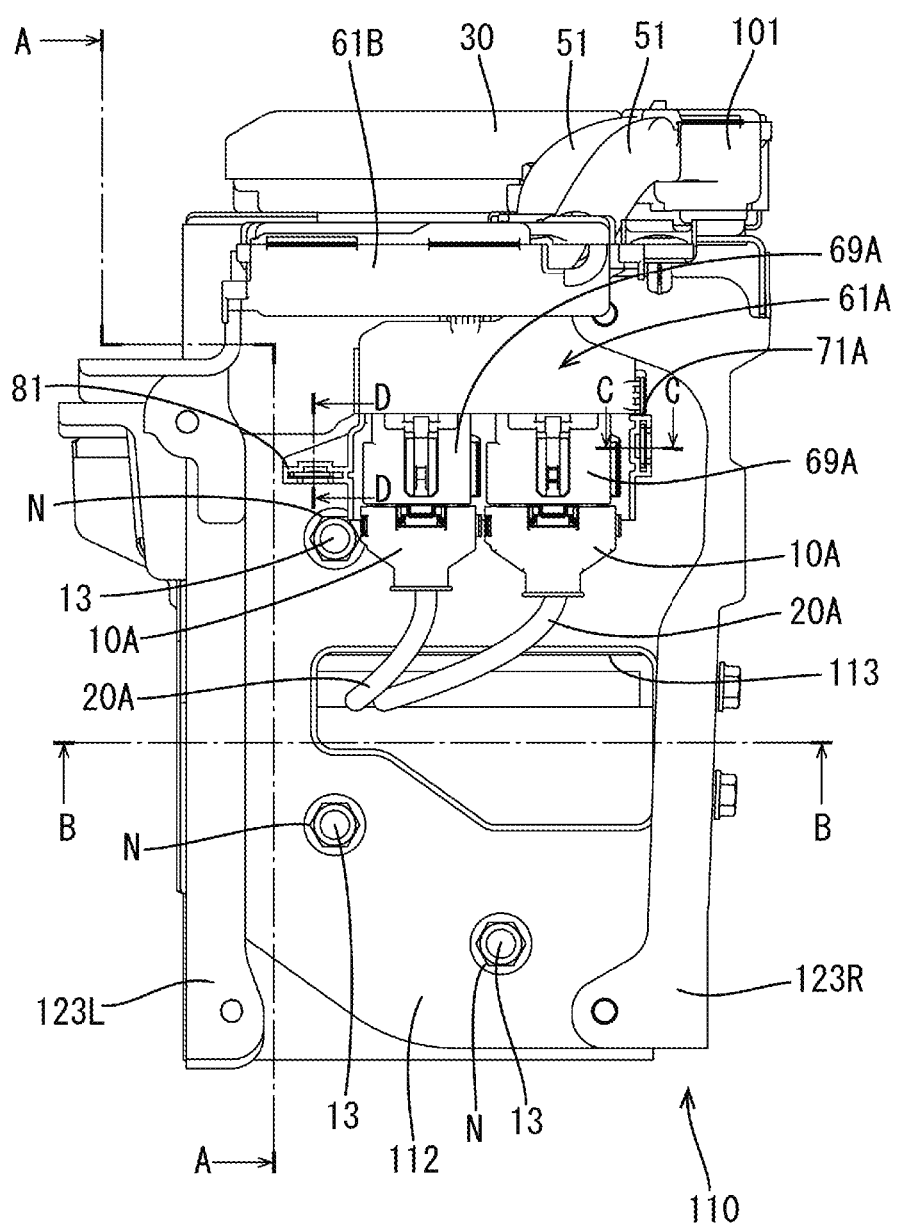
FIG. 23 is a front view of the electric storage module with the ECU and the connection unit mounted thereto with the bracket.
Figure 27:
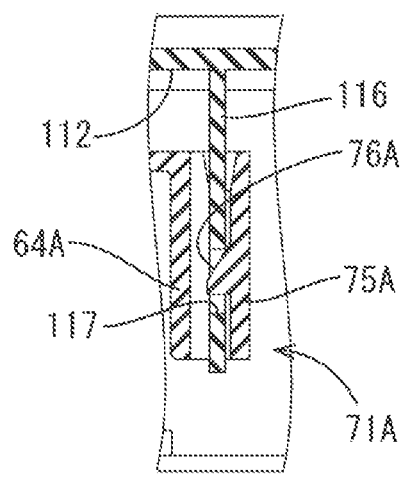
FIG. 27 is a cross-sectional view along line C-C in FIG. 23 illustrating a locking tab of the bracket engaged with a first locking portion of a second connector.
Figure 28:
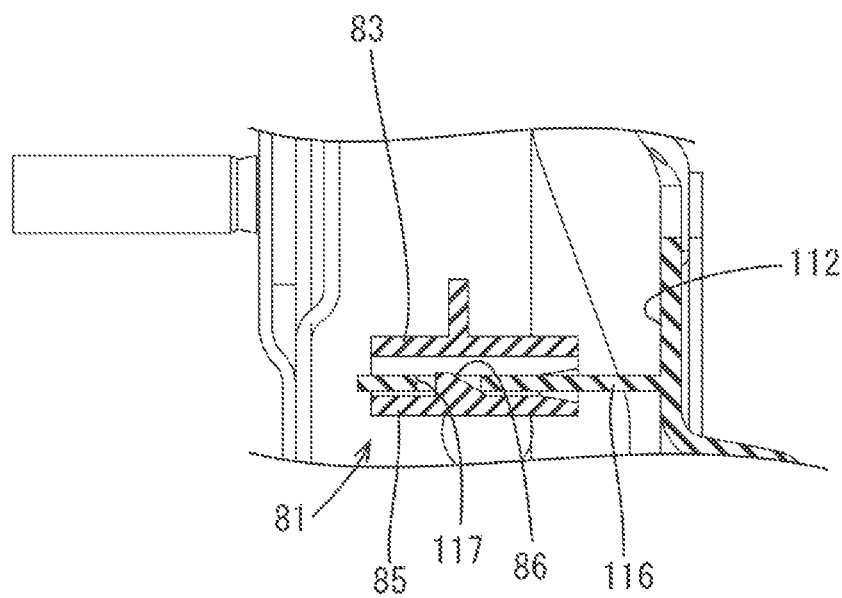
FIG. 28 is a cross-sectional view along line D-D in FIG. 23 illustrating another locking tab of the bracket engaged with a second locking portion of the second connector.
Figure 29:
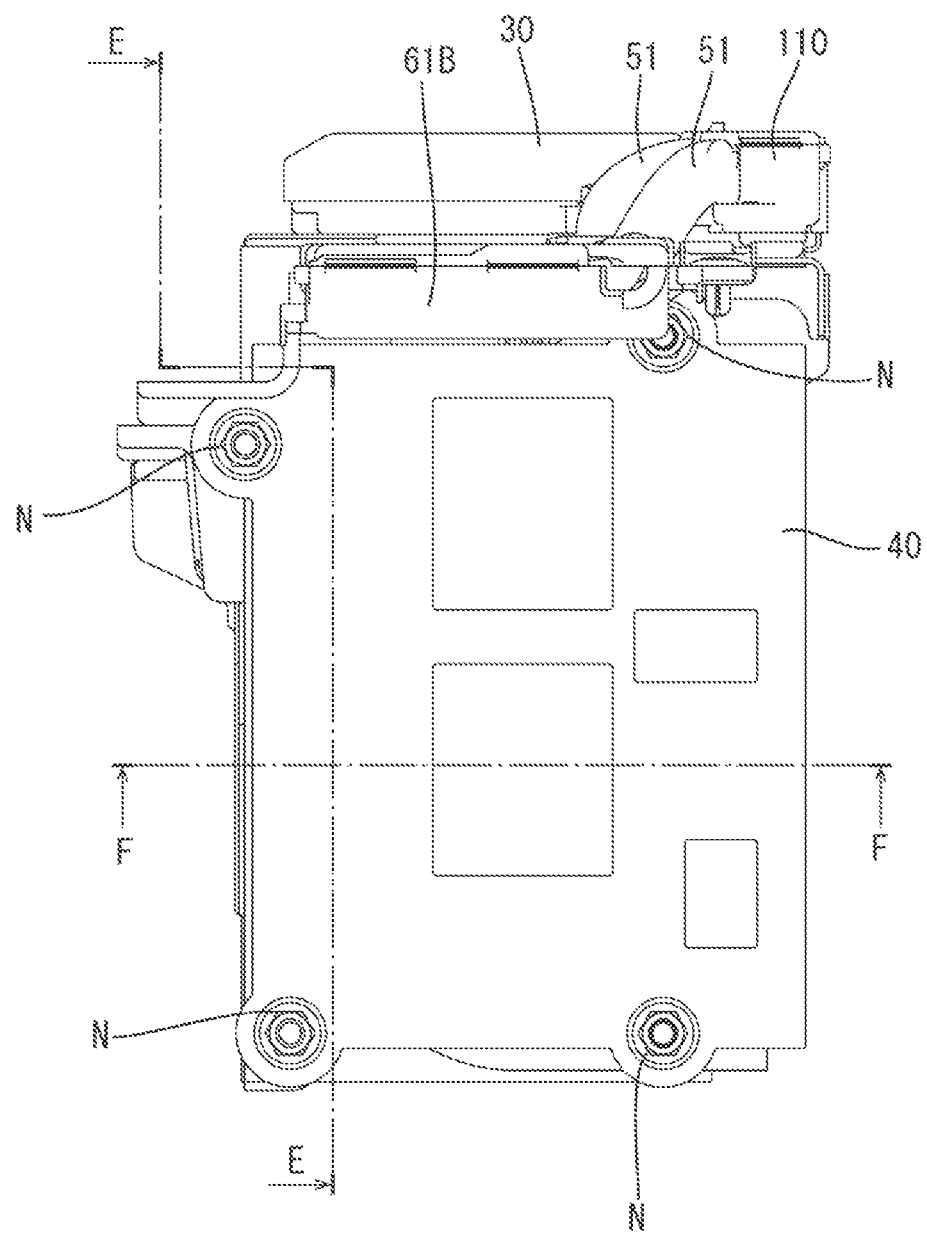
FIG. 29 is a front view of the electric storage module.

As illustrated in FIG. 23, the second connector 61A of two second connectors 61A and 61B is disposed along the opposite surface of the frame body 112 away from the electric storage modules 10A and 10B. The locking tabs 116 extending from the frame body 112 are engaged with the locking portions 71A and 81, respectively. As a result, the second connector 61A is held by the main frame 111. Specifically, as illustrated in FIG. 27, one of the locking tabs 116 is inserted in a gap between the locking wall 72A and the sidewall 64A and the locking protrusion 76A is held against the hole edge of the locking hole 117. As a result, the locking tab 116 is retained in the locking portion 71A. As illustrated in FIG. 28, the other locking tab 116 is inserted in a gap between the locking wall 82 and the holding wall 83 and the locking protrusion 86 is held against the hole edge of the locking hole 117. As a result, the locking tab 116 is retained in the locking portion 81.

As illustrated in FIG. 24, the second connector 61B is fixed to the connector supporting frames 141 and 143 with the locking tab 142 extending from the connector supporting frame 141 engaged with the locking portion 71B and the mounting tab 91 mounted to the connector supporting frame 143 with the screw S. The engagement of the locking tab 142 with the locking portion 71B is similar to the engagement of the locking tab 116 with the locking portion 71A of the second connector 61A.

The third connector 101 is fixed to the ECU mounting portion 131 with the locking tabs 137 of the ECU mounting portion 131 engaged with the locking portions 105, respectively (see FIG. 24). The engagement of the locking tabs 137 with the locking portions 105 is similar to the engagement of the locking tab 116 with locking portion 71A of the second connector 61A described above.

Then, as illustrated in FIGS. 23 and 24, the first connectors 21A connected with the electric storage device 10A are fitted in the hood portions 69A of the second connector 61A, respectively, and the first connectors 21B connected with the electric storage module 10B are fitted in the hood portions 69B of the second connector 61B, respectively.

Finally, the electric junction box 40 is mounted to the bracket 110. As illustrated in FIGS. 30 and 31, the opposed surface 42F of the case body 42 is brought into contact with the junction box mounting plates 123R and 123L from the opposite side from the electric storage modules 10A and 10B. Then, the electric junction box 40 is fixed to the junction box mounting plates 123R and 123L using the bolts B and the nuts N. When the electric junction box 40 is mounted, as illustrated in FIG. 31, one of the columnar portions 45 is passed through the window 113 and in contact with the terminal disposing surface 10F and the other one of the columnar portions 45 is passed through the cutout 114 and in contact with the terminal disposing surface 10F, as illustrated in FIG. 30. The case body 42 is separated from the electric storage modules 10A and 10B.

The first wire harnesses 20A connected with the electric storage module 10A, the first connectors 21A, and the second connectors 61 in which the first connectors 21 A are fitted are disposed in a gap between the case body 42 and the electric storage modules 10A and 10B and in a space defined by peripheral surfaces perpendicular to the terminal disposing surfaces 10F of the electric storage modules 10A and 10B that are disposed on top of each other. Specifically, as illustrated in FIGS. 30 and 31, the peripheral surfaces perpendicular to the terminal disposing surfaces 10F of the electric storage modules 10A and 10B that are disposed on top of each other include an opposite surface of the electric storage module 10A from the electric storage module 10B (a lower surface 10U), an opposite surface of the electric storage module 10B from the electric storage module 10A (the surface on which the wire module 14 is disposed, the upper surface 10T), the side surfaces 10R perpendicular to the lower surface 10U and the upper surface 10T and disposed on the same side, and the side surfaces 10L on the opposite side from the side surfaces 10R. The first wire harnesses 20A, the first connectors 21A, and the second connectors 61A are disposed in a section of the gap defined by a first imaginary plane F1 extending from the lower surface 10U, a second imaginary plane F2 extending from the upper surface 10T, a third imaginary plane F3 extending from the side surface 10R, and a fourth imaginary plane F4 extending from the side surface 10L on the opposite side.

[Conclusion]

The electric storage device 1 according to this embodiment includes the electric storage modules 10A and 10B that include the electric storage components 11. The bracket 110 is attached to the terminal disposing surfaces 10F of the electric storage modules 10A and 10B. The electric junction box 40 is mounted to the bracket 110 from the opposite side from the electric storage modules 10A and 10B with the gap between the electric junction box 40 and the terminal disposing surfaces 10F. The first wire harnesses 20A are disposed in the section of the gap defined by the imaginary planes F1, F2, F3, and F4 extending from the peripheral surfaces (the lower surface 10U, the upper surface 10T, the side surfaces 10R, the side surfaces 10L) perpendicular to the terminal disposing surfaces 10F of the electric storage modules 10A and 10B that are disposed on top of each other.

According to the configuration described above, because the first wire harnesses 20A are disposed in the gap between the electric junction box 40 and the electric storage modules 10A and 10B, the electric storage device 1 can be reduced in size. Furthermore, the first wire harnesses 20A are disposed in the section defined by the imaginary planes F1, F2, F3, and F4 extending from the peripheral surfaces perpendicular to the terminal disposing surfaces 10F of the electric storage modules 10A and 10B. Therefore, the electric storage device 1 can be reduced in size.

The ECU 30 is disposed on the other surface (the upper surface 10T of the electric storage module 10B) different from the terminal disposing surfaces 10F of the electric storage modules 10A and 10B. Furthermore, the second wire harnesses 51 are connected with the ECU 30. The first connectors 21A attached to the first wire harnesses 20A can be fitted in the second connectors 61A attached to the second wire harnesses 51. The second connectors 61A are mounted to the bracket 110.

According to the configuration described above, the electric storage modules 10A and 10B are electrically connected to the ECU 30 by fitting the first connectors 21A in the second connectors 61A.

Because the second connectors 61A are mounted to the bracket 110, the second wire harnesses 51 can be easily positioned. Before the first connectors 21A are fitted in the second connectors 61A, the first wire harnesses 20A can be freely routed. Because the first wire harnesses 20A can be freely routed to fit the first connectors 21A in the second connectors 61A, work efficiency in the fitting improves. When the fitting of the first connectors 21A in the second connectors 61A is completed, the first wire harnesses 20A can be easily positioned because the second connectors 61A is mounted to the bracket 110. Therefore, work efficiency in the routing of the first wire harnesses 20A improves.

Other Embodiments

The technology described herein is not limited to the embodiments, which have been described using the foregoing descriptions and the drawings. For example, various embodiments described below are also within the technical scope of the technology described herein.

(1) In the above embodiment, the electric storage device 1 includes two electric storage module 10A and 10B. However, the electric storage device 1 may include one electric storage module or three or more electric storage modules.

(2) In the above embodiment, only the first wire harnesses 20A connected with the electric storage module 10A are disposed in the gap between the electric junction box 40 and the electric storage modules 10A and 10B. However, all first wire harnesses connected with the electric storage modules may be disposed in the gap between the electric junction box and the electric storage modules.

(3) In the above embodiment, the second connector 61A is fixed to the bracket 110 with the locking tabs 116 engaged with the locking portions 71A and 81 of the second connector 61A. However, the second connector may include locking tabs and the bracket may include locking portions. Alternatively, the second connector may be mounted to the bracket with a mounting structure that is commonly used.

(4) In the above embodiment, the electric junction box 40 is fixed to the terminal disposing surfaces 10F of the electric storage modules 10A and 10B. However, the electric junction box may be mounted to surfaces other than the terminal disposing surfaces. Furthermore, the ECU 30 is mounted along the upper surface 10T of the electric storage module 10B. However, the control unit may be disposed on a surface other than the wire module.

LIST OF REFERENCE NUMERALS

1: Electric storage device
10A: Electric storage module
10B: Electric storage module
10F: Terminal disposing surface (a surface)
10T: Upper surface (a peripheral surface, another surface)
10U: Lower surface (a peripheral surface)
10R: Side surface (a peripheral surface)
10L: Side surface (a peripheral surface)
11: Electric storage component
20A: First wire harness
21A: First connector
30: ECU (a control unit)
40: Electric junction box
51: Second wire harness
61A: Second connector
110: Bracket
F1: First imaginary plane (an imaginary plane)
F2: Second imaginary plane (an imaginary plane)
F3: Third imaginary plane (an imaginary plane)
F4: Fourth imaginary plane (an imaginary plane)

The invention claimed is:

1. An electric storage device comprising:
an electric storage module comprising a plurality of electric storage components, wherein the electric storage module includes an end surface and peripheral surfaces perpendicular to the end surface;
a bracket mounted to the electric storage module and including a first surface opposed to the end surface of the electric storage module and a second surface opposite from the first surface;
an electric junction box mounted to the bracket to be opposed to the second surface of the bracket with a gap between the electric junction box and the second surface of the bracket; and
a wire harness connected to the electric storage module and disposed in a section of the gap in which the end surface of the electric storage module is opposed to the electric junction box.

2. The electric storage device according to claim 1, the electric storage device further comprising:
a control unit disposed on one of the peripheral surfaces of the electric storage module and configured to control states of the electric storage components;
a first connector attached to the wire harness that is defined as a first wire harness;
a second wire harness connected to the control unit; and
a second connector attached to the second wire harness and mounted to the bracket, wherein the second connector is fitted to the first connector.

* * * * *